(12) United States Patent
Puffer et al.

(10) Patent No.: US 12,699,975 B1
(45) Date of Patent: Aug. 4, 2026

(54) SYSTEMS AND METHODS FOR FINANCIAL OPERATIONS PERFORMED AT A CONTACTLESS ATM

(71) Applicant: Wells Fargo Bank, N.A., San Francisco, CA (US)

(72) Inventors: Steven E. Puffer, Champlin, MN (US); Jerome Rhodes, Hayward, CA (US); Michael R. Thomas, San Francisco, CA (US); Hemesh Yadav, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 216 days.

(21) Appl. No.: 16/921,196

(22) Filed: Jul. 6, 2020

Related U.S. Application Data

(63) Continuation of application No. 15/818,557, filed on Nov. 20, 2017, now Pat. No. 10,706,400, which is a
(Continued)

(51) Int. Cl.
| | |
|---|---|
| *G06Q 20/18* | (2012.01) |
| *G06Q 20/10* | (2012.01) |
| *G06Q 20/32* | (2012.01) |
| *G06Q 20/36* | (2012.01) |
| *G06Q 20/38* | (2012.01) |

(Continued)

(52) U.S. Cl.
CPC ........... *G06Q 20/18* (2013.01); *G06Q 20/102* (2013.01); *G06Q 20/3278* (2013.01); *G06Q 20/3674* (2013.01); *G06Q 20/38215* (2013.01); *G06Q 20/40* (2013.01); *H04L 9/08* (2013.01); *G07F 19/20* (2013.01)

(58) Field of Classification Search
CPC .. G06Q 20/18; G06Q 20/102; G06Q 20/3278; G06Q 20/3674; G06Q 20/40; G06Q 20/38215; G06Q 20/1085; H04L 9/08
See application file for complete search history.

(56) References Cited

U.S. PATENT DOCUMENTS

| | | | | | |
|---|---|---|---|---|---|
| 5,365,046 | A | * | 11/1994 | Haymann | .............. G07F 7/1075 235/375 |
| 5,491,691 | A | * | 2/1996 | Shtayer | .............. H04Q 11/0478 370/428 |

(Continued)

*Primary Examiner* — Daniel I Walsh
(74) *Attorney, Agent, or Firm* — Foley & Lardner LLP

(57) ABSTRACT

An automated teller machine (ATM) comprises a network interface circuit enabling the ATM to exchange information over a network, an input/output device configured to exchange data with a mobile wallet circuit on a device associated with a user, and a processing circuit communicably engaged to the network interface circuit and the input/output device and comprising a processor and a memory where the memory is structured to store instructions that are executable by the processor and cause the processing circuit to receive, by the input/output device, a token from the mobile wallet circuit, determine whether the token is associated with a financial institution (FI) associated with the ATM, and transmit, in response to determining that the token is not associated with the FI, the token to a third party computing system without detokenizing the token.

16 Claims, 11 Drawing Sheets

Related U.S. Application Data continuation-in-part of application No. 15/351,767, filed on Nov. 15, 2016, now Pat. No. 10,535,047.

(60) Provisional application No. 62/257,519, filed on Nov. 19, 2015.

(51) Int. Cl.
  G06Q 20/40　　　(2012.01)
  H04L 9/08　　　(2006.01)
  *G07F 19/00*　　　(2006.01)

(56) References Cited

U.S. PATENT DOCUMENTS

| | | | |
|---|---|---|---|
| 5,892,900 A | 4/1999 | Ginter et al. | |
| 6,442,532 B1 | 8/2002 | Kawan | |
| 7,467,141 B1 | 12/2008 | Steele et al. | |
| 9,355,530 B1 | 5/2016 | Block et al. | |
| 9,652,770 B1* | 5/2017 | Kurani | G06Q 20/40 |
| 9,811,856 B2* | 11/2017 | Mishra | G06Q 40/02 |
| 10,019,607 B2 | 7/2018 | Hopt | |
| 10,157,364 B1 | 12/2018 | Koeppel et al. | |
| 10,373,158 B1 | 8/2019 | James et al. | |
| 10,438,198 B1 | 10/2019 | Griffin et al. | |
| 10,467,604 B1 | 11/2019 | Dorsch et al. | |
| 10,521,814 B1 | 12/2019 | Collins et al. | |
| 10,535,047 B1* | 1/2020 | Thomas | G06Q 20/326 |
| 10,692,138 B1 | 6/2020 | Nguyen et al. | |
| 10,706,400 B1* | 7/2020 | Puffer | G06Q 20/38215 |
| 10,778,435 B1* | 9/2020 | Wimberley | H04L 9/3231 |
| 10,803,428 B2 | 10/2020 | Sheehan et al. | |
| 10,885,410 B1 | 1/2021 | Rule et al. | |
| 10,963,850 B2 | 3/2021 | Aldridge et al. | |
| 10,997,592 B1* | 5/2021 | Kurani | G06Q 20/3821 |
| 11,087,297 B1 | 8/2021 | Thomas et al. | |
| 11,210,885 B2 | 12/2021 | S. | |
| 11,308,481 B1* | 4/2022 | Thomas | G06Q 20/40155 |
| 11,386,223 B1* | 7/2022 | Fakhraie | G06F 21/6245 |
| 11,699,333 B1 | 7/2023 | Philbrick et al. | |
| 11,704,687 B1 | 7/2023 | De Frank et al. | |
| 11,727,386 B2 | 8/2023 | Mcgraw et al. | |
| 11,928,666 B1* | 3/2024 | Cook | G06F 16/9566 |
| 12,159,269 B2* | 12/2024 | Phillips | G06Q 20/1085 |
| 12,243,043 B1* | 3/2025 | Thomas | G06Q 20/322 |
| 2001/0044777 A1* | 11/2001 | Haley | G07F 19/20 705/43 |
| 2002/0035541 A1* | 3/2002 | Makino | G06Q 20/1085 705/42 |
| 2002/0048369 A1 | 4/2002 | Ginter et al. | |
| 2002/0078360 A1* | 6/2002 | Black | G06Q 20/10 705/64 |
| 2002/0082962 A1* | 6/2002 | Farris | G07F 19/20 705/35 |
| 2002/0124176 A1* | 9/2002 | Epstein | G06Q 20/341 713/168 |
| 2002/0152166 A1* | 10/2002 | Dutta | G06Q 20/326 705/45 |
| 2002/0152180 A1 | 10/2002 | Turgeon | |
| 2003/0125054 A1* | 7/2003 | Garcia | G06V 30/1423 455/411 |
| 2003/0163423 A1* | 8/2003 | Holst-Roness | G07F 7/025 705/40 |
| 2003/0200179 A1 | 10/2003 | Kwan | |
| 2003/0217005 A1 | 11/2003 | Drummond et al. | |
| 2004/0138974 A1 | 7/2004 | Shimamura et al. | |
| 2004/0204078 A1 | 10/2004 | Fare et al. | |
| 2004/0258281 A1 | 12/2004 | Delgrosso et al. | |
| 2005/0203843 A1 | 9/2005 | Wood et al. | |
| 2006/0022032 A1* | 2/2006 | Fillinger | G06Q 40/02 235/379 |
| 2006/0167784 A1 | 7/2006 | Hoffberg | |
| 2006/0169764 A1 | 8/2006 | Ross et al. | |
| 2006/0184456 A1 | 8/2006 | de Janasz | |
| 2006/0191996 A1 | 8/2006 | Drummond et al. | |
| 2006/0206709 A1 | 9/2006 | Labrou et al. | |
| 2006/0242404 A1 | 10/2006 | Su | |
| 2006/0294378 A1* | 12/2006 | Lumsden | G06Q 20/3829 713/171 |
| 2007/0033397 A1 | 2/2007 | Phillips Ii et al. | |
| 2007/0192178 A1 | 8/2007 | Fung et al. | |
| 2007/0294528 A1 | 12/2007 | Shoji et al. | |
| 2007/0295810 A1 | 12/2007 | Hopt et al. | |
| 2008/0075235 A1 | 3/2008 | Russikoff | |
| 2008/0109375 A1 | 5/2008 | Ricci et al. | |
| 2008/0296377 A1 | 12/2008 | Hopt et al. | |
| 2009/0024506 A1* | 1/2009 | Houri | G06Q 40/00 705/35 |
| 2009/0101707 A1* | 4/2009 | Kurasaki | G07F 7/10 235/380 |
| 2009/0164372 A1* | 6/2009 | Dell | G07F 19/202 705/45 |
| 2009/0254440 A1 | 10/2009 | Pharris | |
| 2009/0302109 A1 | 12/2009 | Kerner et al. | |
| 2010/0153266 A1* | 6/2010 | Plunkett | G06Q 20/04 705/40 |
| 2010/0251360 A1 | 9/2010 | Sinclair | |
| 2011/0161233 A1 | 6/2011 | Tieken | |
| 2011/0191237 A1 | 8/2011 | Faith et al. | |
| 2011/0220714 A1 | 9/2011 | Drummond et al. | |
| 2011/0238573 A1 | 9/2011 | Varadarajan | |
| 2011/0251956 A1* | 10/2011 | Cantley | G06Q 40/02 235/379 |
| 2011/0320628 A1 | 12/2011 | Gutarin et al. | |
| 2012/0047070 A1 | 2/2012 | Pharris | |
| 2012/0197797 A1* | 8/2012 | Grigg | G06Q 20/1085 705/43 |
| 2012/0197798 A1 | 8/2012 | Grigg et al. | |
| 2012/0237023 A1* | 9/2012 | Arnold | H04L 9/0897 380/44 |
| 2012/0239570 A1 | 9/2012 | Wolfs et al. | |
| 2012/0239572 A1* | 9/2012 | Wolfs | G06Q 20/1085 705/44 |
| 2012/0239577 A1* | 9/2012 | Wolfs | G06Q 20/3829 705/64 |
| 2012/0239579 A1* | 9/2012 | Wolfs | G06Q 20/385 705/72 |
| 2012/0275600 A1* | 11/2012 | Arnold | H04L 9/08 380/277 |
| 2012/0284194 A1* | 11/2012 | Liu | G07F 7/08 705/66 |
| 2013/0018787 A1 | 1/2013 | Andrews et al. | |
| 2013/0018793 A1 | 1/2013 | Wong et al. | |
| 2013/0124411 A1 | 5/2013 | Kobres et al. | |
| 2013/0226799 A1 | 8/2013 | Raj | |
| 2013/0238488 A1 | 9/2013 | Bouey et al. | |
| 2013/0238498 A1* | 9/2013 | Forsyth | G06Q 20/18 705/43 |
| 2013/0246258 A1 | 9/2013 | Dessert | |
| 2013/0282588 A1 | 10/2013 | Hruska | |
| 2013/0311375 A1 | 11/2013 | Priebatsch | |
| 2013/0332361 A1* | 12/2013 | Ciurea | G07F 9/009 705/44 |
| 2014/0059088 A1* | 2/2014 | Mattsson | G06F 16/258 707/803 |
| 2014/0074724 A1* | 3/2014 | Gordon | G06Q 20/40 705/44 |
| 2014/0149293 A1 | 5/2014 | Laracey | |
| 2014/0279490 A1 | 9/2014 | Calman et al. | |
| 2014/0324689 A1* | 10/2014 | Pinault | G06Q 20/3223 705/41 |
| 2014/0358777 A1 | 12/2014 | Gueh | |
| 2015/0032626 A1 | 1/2015 | Dill et al. | |
| 2015/0046338 A1 | 2/2015 | Laxminarayanan et al. | |
| 2015/0058216 A1 | 2/2015 | Luciani | |
| 2015/0112870 A1 | 4/2015 | Nagasundaram et al. | |
| 2015/0142647 A1 | 5/2015 | Johnson et al. | |
| 2015/0199681 A1 | 7/2015 | Salgado et al. | |
| 2015/0199689 A1 | 7/2015 | Kumnick et al. | |
| 2015/0242662 A1 | 8/2015 | Claessen | |
| 2015/0254647 A1 | 9/2015 | Bondesen et al. | |

(56)                References Cited

U.S. PATENT DOCUMENTS

| | | | |
|---|---|---|---|
| 2015/0254655 A1* | 9/2015 | Bondesen | G06Q 20/3821 |
| | | | 705/72 |
| 2015/0312038 A1 | 10/2015 | Palanisamy | |
| 2015/0356560 A1 | 12/2015 | Shastry et al. | |
| 2016/0028550 A1 | 1/2016 | Gaddam et al. | |
| 2016/0162869 A1 | 6/2016 | Gupta et al. | |
| 2016/0314458 A1* | 10/2016 | Douglas | G06Q 20/321 |
| 2016/0321652 A1 | 11/2016 | Dimmick et al. | |
| 2016/0350747 A1 | 12/2016 | Pruthi et al. | |
| 2016/0358139 A1* | 12/2016 | Keys | G06Q 20/385 |
| 2017/0091758 A1 | 3/2017 | Kim et al. | |
| 2017/0161741 A1 | 6/2017 | Ross et al. | |
| 2017/0200150 A1 | 7/2017 | Cohn et al. | |
| 2017/0200155 A1 | 7/2017 | Fourez et al. | |
| 2017/0213055 A1 | 7/2017 | Hopt | |
| 2017/0228733 A1* | 8/2017 | Jordan | G06Q 20/385 |
| 2017/0300909 A1 | 10/2017 | Bansal et al. | |
| 2017/0339020 A1 | 11/2017 | Khanna | |
| 2017/0344975 A1 | 11/2017 | Loesch | |
| 2017/0357965 A1 | 12/2017 | Knopp | |
| 2018/0068297 A1* | 3/2018 | Goodman | G06Q 40/02 |
| 2018/0144339 A1 | 5/2018 | Beidas | |
| 2018/0211247 A1 | 7/2018 | England et al. | |
| 2018/0225666 A1 | 8/2018 | Khan et al. | |
| 2018/0300991 A1 | 10/2018 | Park | |
| 2018/0336376 A1 | 11/2018 | Pavageau et al. | |
| 2018/0349881 A1 | 12/2018 | Steele et al. | |
| 2019/0066073 A1 | 2/2019 | Yen et al. | |
| 2019/0180275 A1 | 6/2019 | Safak | |
| 2019/0207754 A1 | 7/2019 | Iyer et al. | |
| 2019/0295055 A1* | 9/2019 | Kuchenski | G06Q 20/1085 |
| 2019/0325424 A1 | 10/2019 | Yeddula et al. | |
| 2019/0385151 A1* | 12/2019 | Dao | G06Q 20/02 |
| 2020/0167761 A1* | 5/2020 | Vityaz | G06Q 20/3276 |
| 2020/0186522 A1 | 6/2020 | Apturkar et al. | |
| 2020/0210996 A1* | 7/2020 | Edwards | G06Q 20/3674 |
| 2020/0244703 A1 | 7/2020 | Chua | |
| 2020/0380490 A1* | 12/2020 | Jayachandran | G06Q 20/40 |
| 2021/0019741 A1* | 1/2021 | Kurani | G06Q 20/3674 |
| 2021/0042743 A1 | 2/2021 | Green et al. | |
| 2021/0158315 A1 | 5/2021 | Phillips et al. | |
| 2022/0012740 A1* | 1/2022 | Bacastow | G06Q 20/405 |
| 2022/0092598 A1* | 3/2022 | Harrow | G07D 19/20 |
| 2022/0321351 A1* | 10/2022 | Yucra Rodriguez | H04L 51/42 |
| 2022/0414675 A1* | 12/2022 | Kohli | G06Q 20/326 |
| 2023/0004947 A1* | 1/2023 | Hammad | H04W 12/069 |
| 2023/0153792 A1* | 5/2023 | Kurani | G06Q 20/354 |
| | | | 705/76 |
| 2024/0346474 A1 | 10/2024 | Jain | |

* cited by examiner

400

SYSTEMS AND METHODS FOR FINANCIAL OPERATIONS PERFORMED AT A CONTACTLESS ATM

CROSS-REFERENCE TO RELATED PATENT APPLICATIONS

This application is a continuation of U.S. patent application Ser. No. 15/818,557, filed on Nov. 20, 2017, which is a continuation-in-part of U.S. patent application Ser. No. 15/351,767, filed on Nov. 15, 2016, now U.S. Pat. No. 10,535,047, which claims priority to U.S. Provisional Patent Application No. 62/257,519, filed on Nov. 19, 2015, each of which are incorporated herein by reference in their entireties.

BACKGROUND

Various types of personal and financial information are provided to financial institution (FI) customers in the form of physical cards and fobs. For example, customers are commonly issued plastic cards corresponding to various accounts at an FI, such as a debit card for a checking account. Where a given customer maintains multiple accounts at multiple entities, the customer often accumulates a number of cards that may be difficult to manage, or may even become lost or stolen.

SUMMARY

One embodiment relates to an automated teller machine (ATM) associated with an FI. The ATM includes a network interface circuit enabling the ATM to exchange information over a network, an input/output device configured to exchange data with a mobile wallet circuit on a mobile device associated with a customer, and a processing circuit communicably engaged to the network interface circuit and the input/output device. The processing circuit includes a processor and a memory, the memory structured to store instructions that are executable by the processor. The instructions cause the processing circuit to receive, by the input/output device, a payment token from the mobile wallet circuit and determine whether the payment token is associated with the FI. The instructions further cause the processing circuit to, in response to determining that the payment token is associated with the FI, detokenize the payment token to identify an account associated with the customer and process an ATM transaction using the customer account.

Another embodiment relates to a method of completing transactions at an automated teller machine (ATM) associated with an FI. The method includes receiving, by an input/output device of the ATM, a payment token from a mobile wallet circuit on a mobile device and determining, by a processing circuit of the ATM, whether the payment token is associated with the FI. The method further includes, in response to determining that the payment token is associated with the FI, detokenizing, by the processing circuit, the payment token to identify an account associated with the customer and processing, by the processing circuit, an ATM transaction using the customer account.

Another embodiment relates to a mobile device associated with a customer. The mobile device includes a network interface circuit enabling the mobile device to exchange information over a network, an input/output device configured to exchange data with a mobile wallet circuit on a mobile device, and a processing circuit communicably engaged to the network interface circuit and the input/output device. The processing circuit includes a processor and a memory, the memory structured to store instructions that are executable by the processor. The instructions cause the processing circuit to receive, by the network interface circuit, a payment token representing an account held by the customer, generate a cryptogram associated with the payment token, and transmit, by the network interface circuit, the payment token and the cryptogram to an automated teller machine (ATM). The instructions further cause the processing circuit to display, by the input/output device, a screen requesting customer authentication information from the customer, receive, by the input/output device, the customer authentication information from the customer, and transmit, by the network interface circuit, the customer authentication information to the ATM.

DETAILED DESCRIPTION

Figure 1:
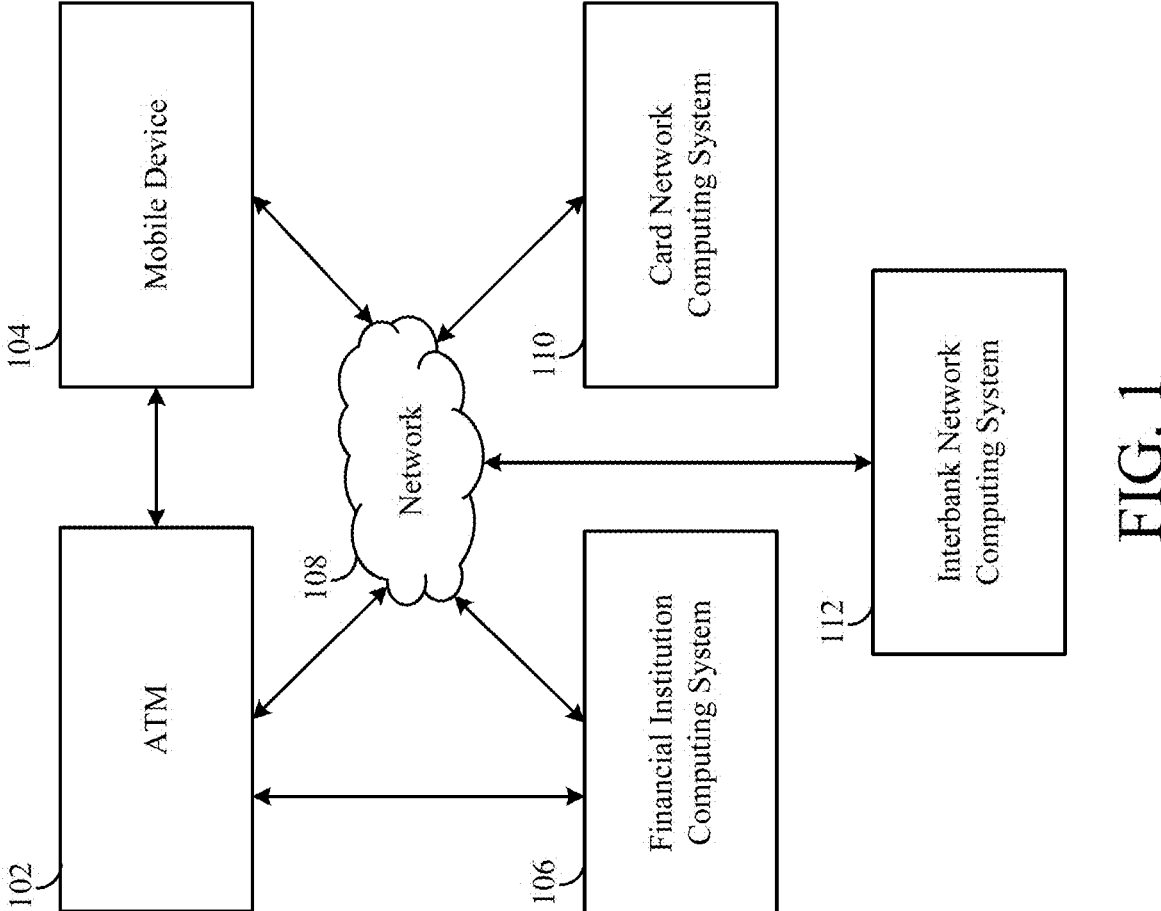
FIG. 1 is a block diagram illustrating a transaction system incorporating a contactless ATM, according to an example embodiment.
Figure 1:

In example embodiments, a contactless automated teller machine ("ATM") system 100 uses payment card tokens to facilitate customer transaction operations performed at ATMs. Payment card tokens are surrogate values that replace the primary account number ("PAN") associated with a payment card, such as a credit card, debit card, ATM card, stored value card, etc. Payment card tokens can pass basic validation rules of an account number. Hence, in the case of a debit card, the payment card token for a given debit card "looks like" a real debit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a mobile device (e.g., a smartphone) for in-person or on-line transactions with a merchant, and so on.

In example embodiments, to process operations at an ATM, an operation is processed using a mobile device and a payment card token stored in the mobile device in lieu of a payment card and a PAN (e.g., the 16-digit account number stored in a magnetic strip on the payment card). The ATM obtains the payment card token from the mobile device. The payment card token is detokenized in order to allow for the completion of an operation. Detokenization refers to the process of replacing a payment token with its associated PAN value based on the payment token-to-PAN mapping information stored in a token database, which is sometimes referred as a "token vault." The token database may also maintain other information that may be used to apply restrictions or other controls during transaction processing.

Payment tokens corresponding to a plurality of PANs may be collected, stored, and exchanged by a mobile wallet application on a customer mobile device. A customer may use the mobile wallet application to organize and use various forms of payment. For example, a customer may open a mobile wallet account via the mobile wallet application and cause payment tokens corresponding to a plurality of accounts to be stored on the mobile device. Payment tokens may be provided to the mobile device by, for example, wireless transmissions (e.g., radio frequency transmissions, such as near field communication ("NFC")) between a given payment card and the mobile device. A card network computing system (e.g., associated with VISA®) may also provision payment tokens to the mobile device over a network (e.g., over the Internet).

In example embodiments, processing operations using such payment card tokens provides enhanced security in connection with the operations. The payment card tokens may be limited in use (e.g., only in connection with a specific entity such as a merchant, only in connection with ATMs, only in connection with a mobile device of a customer). In the event of a security breach at a given computing system, the risk of subsequent fraud is reduced because only the payment card tokens are exposed, which cannot be used by unauthorized entities. That is, a fraudster would not be able to use a customer payment token to perform transactions (e.g., because the fraudster is not using the mobile device of the customer, because the fraudster is attempting a non-ATM transaction).

Referring to FIG. 1, a contactless ATM system 100 includes an ATM 102, a mobile device 104, an FI computing system 106, a card network computing system 110, and an interbank network computing system 112. The FI computing system 106 is a computing system at an FI that is capable of maintaining customer accounts (e.g., payment card accounts) and databases of customer information. In the context of the present disclosure, the FI can include commercial or private banks, credit unions, investment brokerages, or the like.

The card network computing system 110 is a computing system associated with a card network. Examples of card networks include Visa® and MasterCard®. The card network computing system 110 performs operations associated with the generation and issuance of payment card tokens and maintains the established mapping of payment card tokens-to-PANs in a token database (e.g., a token vault). The card network computing system 110 is also configured to detokenize payment card tokens to process various transactions.

The interbank network computing system 112 is a computing system associated with one or more interbank networks (e.g., Maestro, NYCE, PLUS, Cirrus, STAR). An interbank network includes a plurality of member FIs. The interbank network computing system 112 enables customers of a first interbank network member to perform ATM transactions at an ATM owned or operated by a second interbank network member. Further, the interbank network computing system 112 enables customers to use an independently owned ATM (i.e., not owned or operated by an FI) to perform ATM transactions with interbank network members. For example, a customer uses an independently owned ATM to request a withdrawal from an account held at the FI computing system 106. The ATM interfaces with the interbank network computing system 112, and the interbank network computing system 112 routes the request to the FI computing system 106. The FI computing system 106 informs the interbank network computing system 112 that the customer has sufficient funds for the requested withdrawal and authorizes the ATM 102 to dispense cash to the customer against the customer account.

The ATM 102 is a computing system configured to provide an interface between a customer and the FI computing system 106, allowing the customer to access information at and perform transactions with the corresponding FI. For example, in various arrangements, the ATM 102 is configured to allow a customer to view account balances, deposit checks, transfer funds, or withdraw funds from a given account in the form of cash. In some embodiments, the ATM 102 is disposed at a brick and mortar banking facility associated with the FI. In other embodiments, the ATM 102 is a standalone computing terminal (e.g., disposed at an unrelated retail facility, within an office building). The ATM 102 includes hardware and associated logics enabling contactless data transfers, for example, using radio frequency identification ("RFID") and/or NFC.

The mobile device 104 is a computing system associated with a customer of the FI. The mobile device 104 is configured to allow the mobile device 104 to execute software applications (e.g., the mobile wallet application), access websites, generate graphical user interfaces, receive various inputs, generate various outputs, and perform other similar operations. Examples of the mobile device 104 include smartphones, tablets, wearable computing devices such as eyewear and watches, and so on. In addition, the mobile device 104 includes hardware and associated logics enabling contactless data transfer processes that are compatible with the ATM 102.

A network 108 enables the components of the system 100 to communicate with each other (i.e., the ATM 102, the mobile device 104, the FI computing system 106, the card network computing system 110, and the interbank network computing system 112). The network 108 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 108 includes the internet. In other arrangements, the network 108 includes a proprietary network between the ATM 102 and the FI computing system 106 (e.g., where the FI owns and/or operates the ATM 102). In still other arrangements, the network 108 includes a communication medium allowing the ATM 102 to communicate with third parties (e.g., the interbank network computing system 112, the FI computing system 106).

In operation, the system allows a customer to securely access information at and perform transactions with the FI through the ATM 102 using the mobile device 104 in lieu of a physical payment card (e.g., an ATM card, a debit card). A payment token stored in a mobile wallet application on the mobile device 104 serves as a substitute for the payment card. As such, the payment token can be used to identify the customer, identify accounts at the FI associated with the customer, and authenticate the customer's access to the accounts.

In one arrangement, a customer downloads and installs a mobile wallet application on the mobile device 104. The customer then uses the mobile wallet application to cause a payment token corresponding to an account to be disposed in the mobile device 104 (e.g., from a chip on a payment card, from the card network computing system 110 over the network 108). The customer walks up to the ATM 102, selects the payment token via the mobile wallet application, and causes the mobile device 104 to transfer the payment token to the ATM 102. Transferring the token may be accomplished through complementary contactless data transfer devices at the ATM 102 and the mobile device 104. For example, an NFC device on the mobile device 104 can be used to wirelessly transfer the token to a receiving NFC device at the ATM 102. In some arrangements, the transmission of the payment token "wakes up" the ATM 102 from a sleep or standby mode (e.g., where a display at the ATM 102 passively displays a screensaver or a welcome or instruction screen). The ATM 102 may further request additional authentication information such as a personal identification number ("PIN"), which the customer may enter on a numerical keypad. In some arrangements, the PIN is simultaneously transmitted with the payment token to the ATM 102 (e.g., where the customer selects a payment card and provides the PIN to the mobile device 104, and the mobile device 104 transmits the token and PIN to the ATM 102).

In some arrangements, the ATM 102 may use the payment token to assemble a zero or negligible value transaction request (e.g., $0.00, $0.01) in order to identify the customer financial account and the FI corresponding to the payment token. The transaction request may be assembled such that it resembles a standard payment transaction (e.g., a purchase of $0.00, with the payment token as the method of payment) from a point of sale (e.g., at a retail terminal). In one arrangement, the transaction request includes the payment token and an ATM identifier (an "ATM ID"). The ATM ID is a code sufficient to identify the specific ATM 102 being used by the customer, and may be included in the transaction request. In one such an arrangement, the ATM 102 transmits the transaction request to the card network computing system 110. The card network computing system 110 treats the transaction request as a normal transaction, detokenizing the payment token to reveal the corresponding PAN. The card network computing system 110 provides the PAN to the FI computing system 106, which identifies the customer account and the customer, and enables further transactions at the ATM 102.

In other arrangements, the ATM 102 is not configured to generate zero or negligible value transaction requests. In one arrangement, where the ATM 102 is not associated with the FI that issued the payment card corresponding to the payment token, the ATM 102 generates a standard ATM transaction request, which is received by the card network computing system 110 over the network 108. The card network computing system 110 detokenizes the payment card token to reveal a PAN, which is transmitted to the interbank network computing system 112. The interbank network computing system 112 transmits the PAN and the ATM transaction request to the FI computing system 106, which authenticates and authorizes the transaction request. The FI computing system 106 transmits the approval back downstream (e.g., to the interbank network computing system 112, to the card network computing system 110, and to the ATM 102), and customer may then complete one or more ATM transactions.

In yet other arrangements, the ATM 102 and the FI computing system 106 are affiliated with the same FI. Accordingly, the ATM 102 is configured to determine whether a received token is associated with an account held at the FI. If the token is associated with an account held at the FI, the ATM 102 is configured to detokenize the token and decrypt a cryptogram transmitted with the token, if any. The ATM 102 then communicates with the FI computing system 106 to process the customer's ATM transaction request. Conversely, if the token is not associated with an account held at the FI, the ATM 102 is configured to transmit the token and cryptogram, if any, to the card network computing system 110. As described above, the card network computing system 110 detokenizes the payment card token to reveal a PAN, which is transmitted to the interbank network computing system 112. The interbank network computing system 112 then transmits the PAN and the ATM transaction request to an unaffiliated FI computing system (e.g., configured similarly to the FI computing system 106 but affiliated with a different FI) associated with the customer account represented by the token. The unaffiliated FI computing system then authenticates and authorizes the transaction request and transmits the approval back downstream (e.g., to the interbank network computing system 112, to the card network computing system 110, and to the ATM 102), and the customer may then complete one or more ATM transactions. Additional details and functions of the system 100 are discussed below.

Figure 2:
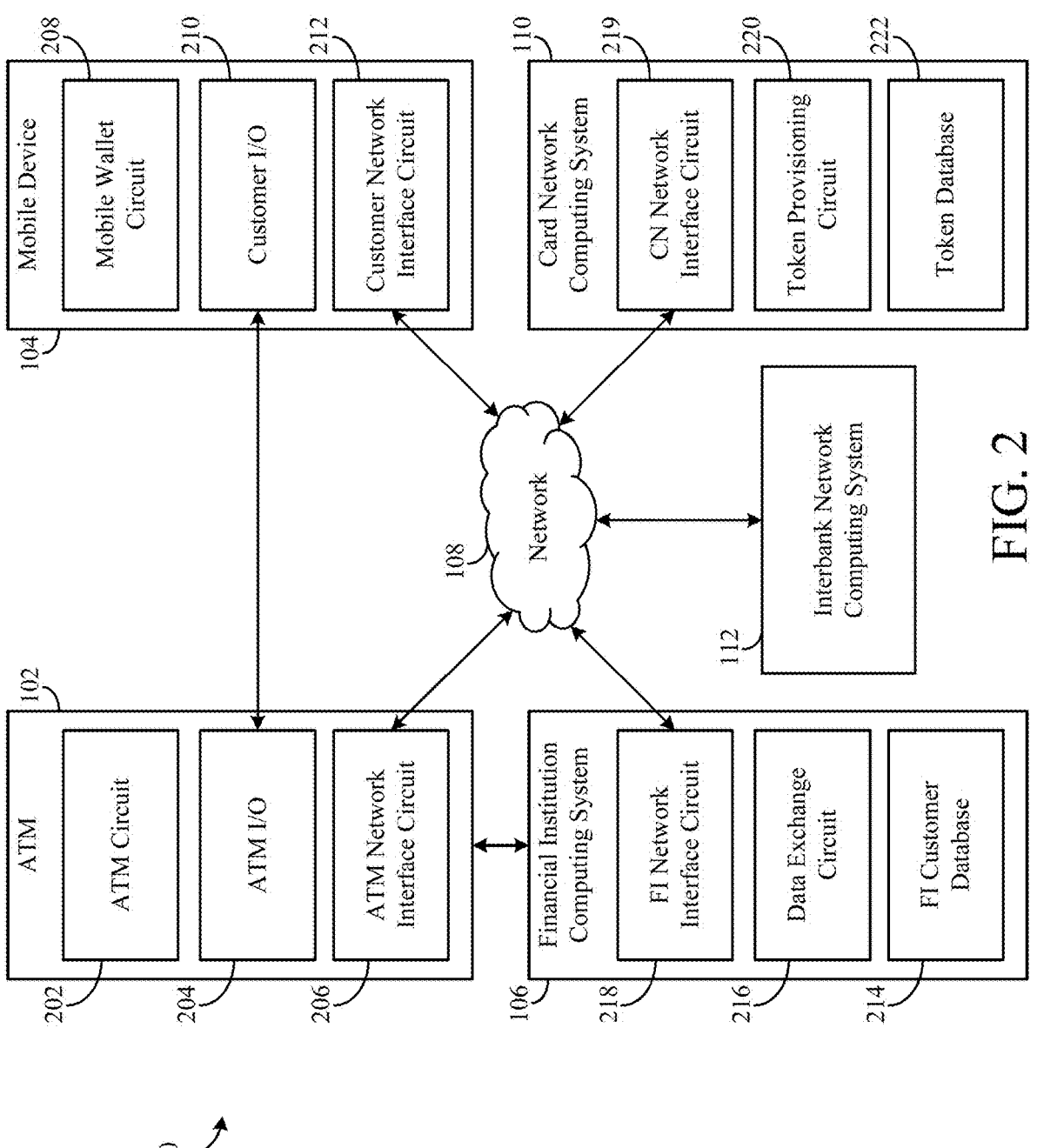
FIG. 2 is a block diagram illustrating additional features of the transaction system shown in FIG. 1.

Referring now to FIG. 2, a more detailed system 200 illustrating example embodiments of the components of the system 100 is shown. The ATM 102 includes an ATM circuit 202, an ATM input and output device ("I/O") 204, and an ATM network interface circuit 206.

With respect to the ATM circuit 202, the ATM circuit 202 is a circuit configured to enable a customer to interface with the FI computing system 106. The ATM circuit 202 exchanges information between a customer via the mobile device 104, the FI computing system 106, the card network computing system 110, and the interbank network computing system 112 to perform various operations. For example, the ATM circuit 202 may be configured to collect authentication information (e.g., a token and a PIN) from the mobile device 104, and send the authentication information to the FI computing system 106, the card network computing system 110, and/or the interbank network computing system 112 over the network 108. Further, the ATM circuit 202 may be configured to receive an authentication confirmation from the FI computing system 106 and allow the customer to create operation requests. Such operation requests may include, for example, balance inquiries, check deposit requests, cash withdrawal requests, and so on. The ATM circuit 202 assembles and transmits a customer's desired operation request to the FI computing system 106, which executes the corresponding financial operation. In some arrangements, the ATM circuit 202 ultimately provides the customer with a requested amount of cash. In other arrangements, the ATM circuit 202 ultimately provides the customer with requested information (e.g., an account balance). As one of skill in the art would recognize, the ATM circuit 202 may provide the customer with various types of outputs corresponding to information exchanged with the FI computing system 106.

The ATM I/O 204 includes one or more devices and associated logic configured to allow a customer to exchange information and interact with the ATM circuit 202. For example, an input aspect of the ATM I/O 204 can include a magstripe reader, a keyboard, a touchscreen, a microphone, a camera, a fingerprint scanner, any user input device engageable to the ATM 102 via a USB, serial cable, and so on. In turn, an output aspect of the ATM I/O 204 can include a digital display, a speaker, illuminating icons, LEDs, a cash dispenser, a paper (e.g., receipts) dispenser, and so on. In addition, the input aspect and the output aspect of the ATM I/O 204 includes a contactless data transmission device. The contactless transmission device includes hardware and associated software sufficient to enable the ATM 102 to wirelessly and securely exchange data over short distances (e.g., within a range of a few inches or less). In some arrangements, the contactless device is configured to use RFID to exchange digital information. In some such arrangements, the contactless device enables the ATM 102 to exchange data over a radio frequency range required for NFC. As such, the ATM I/O 204 can wirelessly send and receive data (e.g., a token) at a local level (i.e., where a customer is physically present at the ATM 102).

The ATM network interface circuit 206 enables the ATM 102 to exchange data over the network 108. As such, the ATM network interface circuit 206 allows the ATM 102 to exchange data to remote computing devices (e.g., the FI computing system 106, the card network computing system 110).

The mobile device 104 includes a mobile wallet circuit 208, a customer input and output device ("I/O") 210, and a customer network interface circuit 212. Similar to the ATM network interface circuit 206, the customer network interface circuit 212 enables the mobile device 104 to exchange data over the network 108. For example, the customer network interface circuit 212 allows the mobile device 104 to exchange data to remote computing devices such as the FI computing system 106.

The customer I/O 210 includes hardware and associated logics configured to enable a customer and the ATM 102 to exchange information with the mobile device 104. An input aspect of the customer I/O 210 allows the customer to provide information to the mobile device 104, and can include, for example, a keyboard, a touchscreen, a microphone, a camera, a fingerprint scanner, any user input device engageable to the mobile device 104 via USB, and so on. In turn, an output aspect of the customer I/O 210 allows the customer to receive information from the mobile device 104, and can include, for example, a digital display, a speaker, illuminating icons, LEDs, and so on. The customer I/O 210 also includes a contactless data transmission device that operates in a manner similar to and compatible with the ATM I/O 204.

In addition to various merchant terminals, online marketplaces, etc., the mobile wallet circuit 208 may exchange information with the ATM 102 to complete one or more transactions. In some arrangements, the mobile wallet circuit 208 includes software issued by or on behalf of the FI (e.g., a software application, or an "app"). In other arrangements, the mobile wallet circuit includes software issued by on or on behalf of a third party wallet provider (e.g., Apple Pay™ or Google Wallet™).

The mobile wallet circuit 208 may be used by an individual user (e.g., a business owner or employee, a consumer, etc.) to create and interact with a mobile wallet account. While setting up a mobile wallet account, the mobile wallet circuit 208 may receive, organize, and store payment tokens from payment cards and/or the card network computing system 110. The mobile wallet circuit 208 may then transmit certain payment tokens to ATM 102 (e.g., via the customer I/O 210) as part of any of a variety of transaction requests to complete various financial operations. For example, the mobile wallet circuit 208 may receive and display screens on the customer I/O 210 including account information, transaction instructions, and so on. In one embodiment, a screen may be used to request a username, password, and PIN information from the user, as well as information sufficient to identify a target account (e.g., to identify a payment token) and a desired transaction type (e.g., a withdrawal).

In one arrangement, a token is provided to the mobile device 104 over the network 108 after the customer creates the mobile wallet circuit 208 (e.g., provisioned by the card network computing system 110, and sent by the FI computing system 106 or the card network computing system 110). In one such an arrangement, the customer registers the mobile device 104 with the FI, for example, creating a username and password to be associated with the customer on the mobile wallet.

In another arrangement, the token is received from a physical payment card provisioned by the card network computing system 110. For example, the card network computing system 110 may cause a physical payment card to be issued that includes a chip housing a secure data storage device. The chip may include the token in the data storage device, and the chip may also be configured to exchange data with a contactless data transmission device (e.g., the customer I/O 210). In one such arrangement, the customer may create the mobile wallet circuit 208 on the mobile device 104, and transfer a copy of the token from the payment card to the mobile wallet circuit 208 via the customer I/O 210. As one of skill in the art would recognize, other approaches to disposing the token on the mobile wallet circuit 208 are possible.

In some arrangements, the mobile wallet circuit 208 is configured to encrypt some or all of outgoing data transmissions that include a token. A unique encryption key may be stored at the mobile device 104, which in some arrangements operates in conjunction with an encryption algorithm and is specific to the mobile device 104. In some arrangements, the unique encryption key is used to create a new cryptogram for each data transmission. A master encryption key may be maintained at the card network computing system 110, which may be used to decrypt cryptograms transmitted by a plurality of mobile wallet circuits. The master encryption key may also be used to verify that a given cryptogram was encrypted properly by the unique encryption key assigned to the mobile device 104 used to create a given transaction request. According to various arrangements, the encryption keys may be provisioned by any of a mobile wallet provider, the FI computing system 106, or the card network computing system 110.

The card network computing system 110 includes a CN network interface circuit 219, a token provisioning circuit 220, and a token database 222. The CN network interface circuit 219 enables the card network computing system 110 to exchange data over the network 108. As such, the CN network interface circuit 219 allows the card network computing system 110 to exchange data to remote computing devices (e.g., the FI computing system 106, the mobile device 104, the interbank network computing system 112).

The token database 222 is a storage medium retrievably storing token information (e.g., a token vault), and may include non-transient data storage mediums (e.g., local disc or flash-based hard drives, local network servers, and the like) or remote data storage facilities (e.g., cloud servers).

The token provisioning circuit 220 is configured to provision and manage tokens. In one aspect, the token provisioning circuit 220 can generate a new unique code to be provisioned as a token, and associate the token with a PAN. Hence, in some embodiments, payment card tokens are generated by the card network computing system 110, and payment token-to-PAN mapping information is maintained by the card network computing system 110. In another aspect, the token provisioning circuit 220 may be able to replace tokens as well as activate and deactivate tokens. The token provisioning circuit 220 may also be configured to associate permissions with each token, thereby allowing or disallowing the transmission or use of data associated with a given token.

For example, an FI may assign a PAN to a customer opening a new financial account, specifically identifying that new account (e.g., a sixteen-digit account number for a payment card associated with the account). In addition, after the customer sets up the mobile wallet circuit 208 on the mobile device 104, the card network computing system 110 may assign a payment token corresponding to the PAN and the mobile wallet circuit 208. In other words, the payment token can be used to identify the PAN and the mobile wallet circuit 208. The PAN, the payment token, and information relating to their respective associations may be stored in the token database 222, and in some arrangements, the FI customer database 214 as well.

The token provisioning circuit 220 may also be configured to maintain and use one or more master encryption keys to decrypt incoming transaction requests. For example, the token provisioning circuit 220 may receive a cryptogram over the network 108 via the CN network interface circuit 219. In one such an arrangement, the cryptogram was created using a unique encryption key properly assigned to the mobile device 104. The token provisioning circuit 220 may decrypt and unpack the cryptogram with the master encryption key, revealing an authentication code (e.g., a stored code associated with the mobile device 104 and/or an authorized user of a subject financial account). The token provisioning circuit 220 may confirm that the cryptogram was made with a properly issued unique encryption key (e.g., whether the decrypted authentication code matches a stored authentication code), retrieve the PAN corresponding to the payment token, and transmit the results to the FI computing system 106 (or the card network computing system 110, as appropriate).

In the expanded system 200, the FI computing system 106 includes a FI customer database 214, a data exchange circuit 216, and an FI network interface circuit 218. The FI network interface circuit 218 is configured to allow the FI computing system 106 and the various components therein to exchange data over the network 108 (e.g., with the ATM 102, the mobile device 104, the card network computing system 110, and/or the interbank network computing system 112).

The FI customer database 214 allows the FI computing system 106 to retrievably store customer information relating to the various operations discussed herein, and may include non-transient data storage mediums (e.g., local disc or flash-based hard drives, local network servers, and the like) or remote data storage facilities (e.g., cloud servers). The FI customer database 214 includes personal customer information (e.g., names, addresses, phone numbers, and so on), identification information (e.g., PINs, social security numbers, driver's license numbers, biometric data, and so on), and customer information (e.g., account numbers, account balances, token information, available credit, credit history, transaction histories, and so on).

The payment token-to-PAN mapping information generated and stored at the card network computing system 110 may also be maintained by the FI customer database 214 at the FI computing system 106. As such, for example, the FI computing system 106 may provide additional token-related management services to customers that are not available through the card network computing system 110. Such services may be useful in situations where customers have multiple different types of accounts (e.g., multiple different types of credit cards, such that a single card network computer system does not have a global view of all of the payment tokens in existence for a given customer). Such services may be useful in situations where other information in addition to account numbers is tokenized by the FI computing system 106 or other computing systems, thereby creating tokens that are not payment tokens.

The data exchange circuit 216 is configured to exchange data among the FI customer database 214, the ATM 102, the mobile device 104, the card network computing system 110, and the interbank network computing system 112. In one aspect, the data exchange circuit 216 may be configured to exchange tokens and permissions with the card network computing system 110, the interbank network computing system 112, and the ATM 102 (e.g., for authentication purposes) and the mobile device 104 (e.g., for the mobile wallet). The data exchange circuit 216 may also be configured to facilitate transactions involving the ATM 102 and the mobile device 104. In one arrangement, the data exchange circuit 216 provides software sufficient to enable the mobile wallet circuit 208 on the mobile device 104. Further, in some arrangements, the data exchange circuit 216 provides a payment token from the card network computing system 110 to the mobile wallet circuit 208 over the network 108. The data exchange circuit 216 is also configured to cooperate with other components of the FI computing system 106 to authenticate and authorize various requests received from the ATM 102.

In operation, in one arrangement, a customer sets up the mobile wallet circuit 208 on the mobile device 104, establishing a mobile wallet. In some arrangements, a unique encryption key is assigned and maintained at the mobile wallet circuit 208 as well. The mobile wallet circuit 208 receives a payment token corresponding to a customer account over the network 108 (e.g., from the FI computing system 106 or the card network computing system 110 via the customer network interface circuit 212). The customer approaches the ATM 102 and allows the mobile wallet circuit 208 to communicate with the ATM circuit 202 via the customer I/O 210 and the ATM I/O 204, respectively. For example, the communication may occur via an NFC data transmission, which may include an ATM transaction request (e.g., for a balance inquiry) and a cryptogram (e.g., an encrypted authentication code). The ATM circuit 202 may request a second layer of authentication information from the customer, for example a PIN, via the ATM I/O 204. The customer may then enter a four digit PIN into the ATM I/O 204 (e.g., via a numerical keypad).

The ATM circuit 202 then processes the ATM transaction request. In one arrangement, the ATM circuit 202 also generates a payment transaction request involving a negligible or zero amount of funds (e.g., a withdrawal of $0.00). In such an arrangement, downstream computing systems (e.g., card network computing system 110, the FI computing system 106, etc.) can process the payment transaction request as normal (e.g., similar to transaction requests generated by point of sale terminals). In some arrangements, the payment transaction request includes an ATM ID. For example, the ATM circuit 202 may transmit a zero dollar payment transaction request and the cryptogram to the card network computing system 110 over the network 108. The card network computing system 110 may decrypt and validate the cryptogram (e.g., via a master encryption key), and detokenize the payment token. The card network computing system 110 may then transmit the resulting PAN and the zero dollar payment transaction request to the FI computing system 106. The FI computing system 106 may then identify the customer and the customer account via the PAN, and the ATM 102 via the ATM ID. For example, where the ATM 102 is associated with the FI computing system 106 (e.g., both are operated by the same issuer), the FI computing system 106 may interface with the ATM 102 over the network 108 or over a proprietary network. The customer may then complete one or more ATM transactions at the ATM 102 (e.g., a cash withdrawal).

In another arrangement, the ATM 102 and the FI computing system 106 are each associated with the same FI. In such an arrangement, the ATM recognizes a received token as belonging to a card issued by the FI, and thus, the token does not need to be sent through the payment network to the card network computing system 110 with a negligible or zero amount transaction to retrieve the subject account. Instead, the ATM circuit 202 transmits the ATM transaction request (e.g., including a token and a cryptogram) to the FI computing system 106 directly (e.g., over the network 108 or via a local data network, bypassing the card network computing system 110 and/or the interbank network computing system 112). The data exchange circuit 216 may detokenize the token to identify a subject account (e.g., using token information stored in the FI customer database 214). In some arrangements, the data exchange circuit 216 may send the cryptogram out for decryption (e.g., to the card network computing system 110 via the network 108) to authenticate the ATM transaction request. In other arrangements, the data exchange circuit 216 may ignore the cryptogram and authenticate the ATM transaction request with other types of customer information (e.g., a PIN entered at the ATM I/O 204). Upon authenticating the ATM transaction request, the data exchange circuit 216 may authorize the requested transaction to occur at the ATM 102.

In yet another arrangement, the ATM circuit 202 processes the authentication request through standard ATM networks. The ATM circuit 202 may transmit the ATM transaction request and the cryptogram to the card network computing system 110. The card network computing system 110 decrypts the cryptogram and detokenizes the payment card token, and passes the resulting PAN and the ATM transaction request on to the interbank network computing system 112. The interbank network computing system 112 identifies the FI computing system 106, and routes the PAN and the ATM transaction request to the FI computing system 106. The FI computing system 106 authenticates and authorizes the ATM transaction request with respect to the PAN, and transmits an appropriate response (e.g., results of a balance inquiry) back upstream to the ATM 102.

Figure 3:
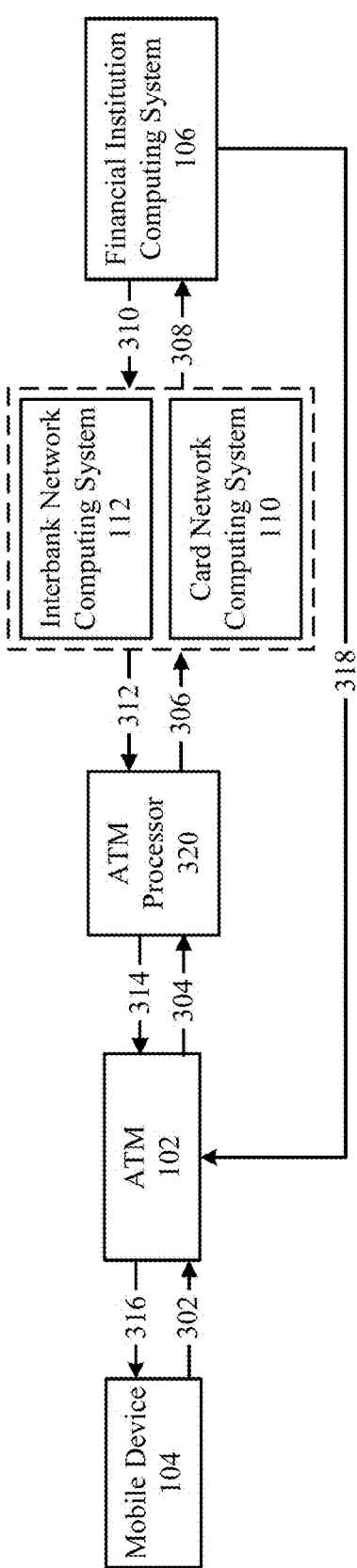
FIG. 3 is a flowchart of a mobile wallet transaction process, according to an example embodiment.

FIG. 3 illustrates a process 300 that may be implemented by the system of FIGS. 1-2. By way of example, FIG. 3 shows a mobile wallet transaction. When a user wishes to transact with the ATM 102, for example, the user may access the mobile wallet circuit 208 by entering a PIN or other login credentials and then selecting a "transact" or similar button via the customer I/O 210. At step 302, the mobile device 104 may transmit a payment token and a cryptogram to the ATM 102 (e.g., via the customer I/O 210, using a QR code, NFC, wireless, Bluetooth, low energy Bluetooth, RFID, hypersonic, Wi-Fi, cellular 3G, 4G, GSM, LiFi, or other method). In some arrangements, at step 316, the ATM 102 provides the mobile device 104 with a confirmation that the payment token was successfully received. The ATM 102 prepares an ATM transaction request (e.g., a cash withdrawal), including the payment token and cryptogram received at 302. In some arrangements, the ATM transaction request includes a zero dollar payment transaction request.

At step 304, the ATM 102 transmits the ATM transaction request to an ATM processor 320. The ATM processor 320 is a networked computing system configured to triage ATM transaction requests prepared by the ATM 102. In some arrangements, the ATM processor 320 is operated by an independent third party associated with the ATM 102 (e.g., where the ATM 102 is owned or operated by a non-issuer entity). In other arrangements, operations discussed with respect to the ATM processor 320 is performed by the FI computing system 106 (e.g., where the ATM 102 is owned or operated by the FI associated with the FI computing system 106). The ATM processor 320 determines the proper card network computing system 110 corresponding to the payment token (e.g., VISA, MasterCard, etc.).

The ATM processor 320 transmits the ATM transaction request to the card network computing system 110 at step 306. The card network computing system 110 decrypts and validates the cryptogram (e.g., via a master decryption key), if any, and detokenizes the payment token. The card network computing system 110 may then forward the resulting PAN and the ATM transaction request to the interbank network computing system 112 to identify the FI computing system 106 (e.g., where the ATM 102 is independently owned, or where the ATM 102 is owned by a first FI and the payment token corresponds to a payment card issued by a second FI).

At 308, the card network computing system 110 or the interbank network computing system 112 transmits the PAN and the ATM transaction request (e.g., including a zero dollar transaction request, if any) to the FI computing system 106. The FI computing system 106 authenticates the PAN (e.g., verifying that the account is still active, has available funds, is not frozen, etc.). In some arrangements, where the ATM 102 is associated with the FI computing system 106 (e.g., by the same issuer FI), the FI computing system 106 may interface with the ATM 102 at 318. In such arrangements, the FI computing system 106 may identify the ATM 102 via an ATM ID included in the ATM transaction request. In other arrangements, the FI computing system 106 may authorize one or more transactions in the ATM transaction request (e.g., a balance inquiry, a withdrawal, etc.), and submit a corresponding response back upstream to the ATM 102 (e.g., at 310, 312, and 314).

Upon receiving a response from the FI computing system 106, the ATM 102 may provide the user with an appropriate output. For example, the response may prompt one or more logics associated with a cash dispenser of the ATM I/O 204 to collect a requested sum of cash for a withdrawal. The ATM I/O 204 may then make the requested sum of cash available to the user (e.g., opening a dispenser door or drawer). In some embodiments, output may further include a receipt provided by the ATM I/O 204. The ATM I/O 204 may send the receipt to the mobile device 104 electronically, or physically print the receipt at the ATM 102.

Figure 4:
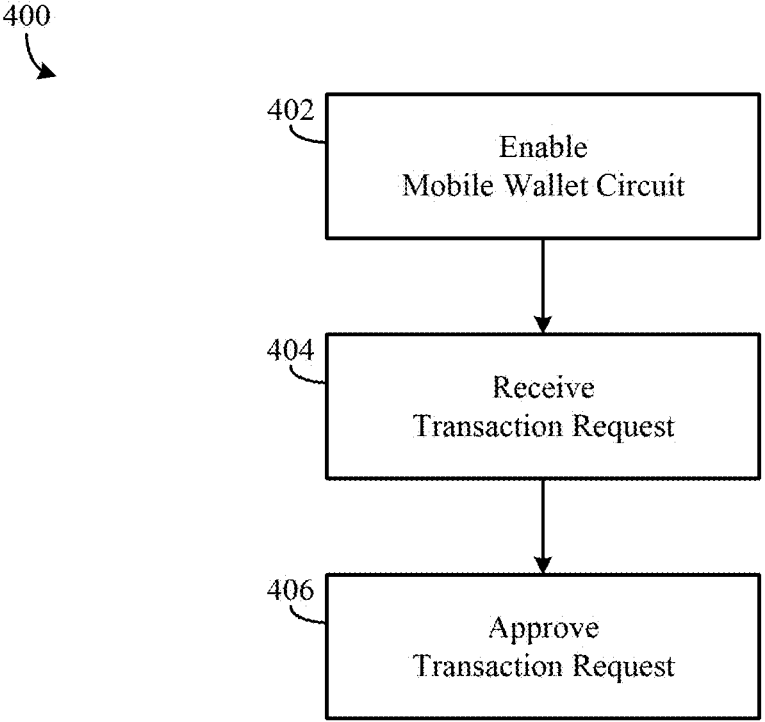
FIG. 4 is a flowchart of a method of completing transactional operation requests generated from a contactless ATM, according to an example embodiment.

Referring now to FIG. 4, a method 400 of completing transactions through a contactless ATM is shown. The method 400 is performed by processing and storage hardware at an FI computing system (e.g., FI computing system 106), as executed by one or more circuits configured to perform the functions described below.

At 402, a mobile wallet circuit (e.g., the mobile wallet circuit 208) is enabled. The mobile wallet circuit may be enabled by a data exchange circuit (e.g., the data exchange circuit 216). In some arrangements, the data exchange circuit enables the mobile wallet circuit by providing software sufficient for the mobile wallet circuit to be assembled on a mobile device (e.g., the mobile device 104). In addition, in some arrangements, the data exchange circuit enables a mobile wallet functionality through the mobile wallet circuit. In other arrangements, the data exchange circuit enables a mobile wallet circuit provided by a third party by maintaining one or more payment card accounts. Such payment card accounts may be tokenized by a card network computing system (e.g., card network computing system 110). The mobile wallet circuit is enabled in a manner sufficient to allow the mobile device to transmit an authentication request and a token to an ATM (e.g., the ATM 102).

At 404, a transaction request is received. The transaction request is received by the data exchange circuit over a network (e.g., the network 108, for example via the FI network interface circuit 218). The transaction request may be received from the card network computing system or an interbank computing system (e.g., the interbank network computing system 112). The transaction request includes a request to authenticate financial operations at the ATM relating to one or more accounts held by a customer. In some arrangements, the authentication request includes a PIN. Further, in some arrangements, the authentication request includes a transaction request involving a nominal or zero amount of funds.

The transaction request also includes detokenized information, including a PAN. The detokenized information is sufficient to identify at least one account held by the customer at the FI computing system 106.

At 406, the transaction request is approved. In one arrangement, the data exchange circuit approves the authentication request if a PIN provided with the transaction request matches a known PIN associated with the customer in the FI customer database (e.g., the FI customer database 214). In some arrangements, the data exchange circuit approves the authentication request if the detokenized information received at 404 includes a permission to perform financial operations at the ATM. In one arrangement, if the authentication request is approved, the data exchange circuit transmits the approval back to the ATM (e.g., over the network via the FI network interface circuit).

Figure 5:
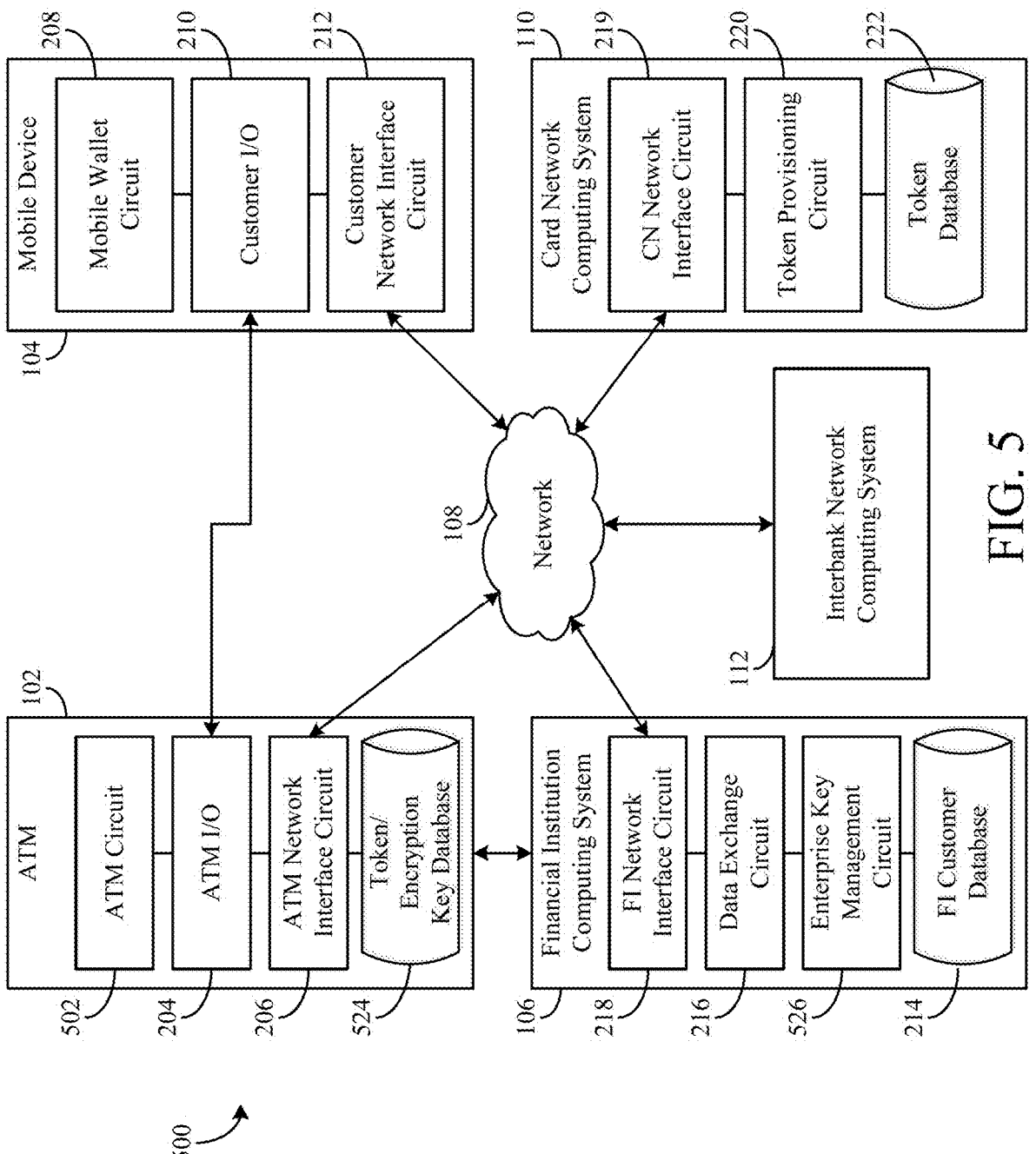
FIG. 5 is a second block diagram illustrating additional features of the transaction system shown in FIG. 1.

Referring now to FIG. 5, a more detailed system 500 illustrating additional example embodiments of the components of the system 100 is shown. In the system 500, the ATM 102 is affiliated with the FI associated with the FI computing system 106. As illustrated in FIG. 5, the mobile device 104 and the card network computing system 110 are configured similarly as shown in the system 200 of FIG. 2. Likewise, the ATM 102 includes an ATM I/O 204 and a ATM network interface circuit 206, which are configured similarly to the ATM I/O 204 and the ATM network interface circuit 206 shown in FIG. 2.

However, in the system 500, the ATM 102 includes an ATM circuit 502 configured somewhat differently from the ATM circuit 202 shown in FIG. 2. Similar to the ATM circuit 202, the ATM circuit 502 is configured to exchange information between a customer and the mobile device 104, the FI computing system 106, the card network computing system 110, and the interbank network computing system 112 to perform various financial operations. Moreover, the ATM circuit 502 is configured to receive an authentication confirmation from FI computing systems, such as from the FI computing system 106, and allow the customer to create operation requests. However, the ATM circuit 502 is also configured to, upon receiving a payment token from the mobile device 104 (e.g., via NFC data transmission), determine whether the payment token is associated with a payment account held at the FI affiliated with the ATM 102 and the FI computing system 106 (e.g., the "affiliated FI"). For example, in some arrangements, the token includes a Bank Identification Number ("BIN") associated with the FI at which the customer account is held. The ATM circuit 502 accordingly recognizes whether the token is associated with the affiliated FI based on the BIN. In other arrangements, a list of tokens associated with accounts held at the FI is stored in a token/encryption key database 524 of the ATM 102. The ATM circuit 502 determines whether the token matches one of the tokens in the token/encryption key database 504 and, if it does, determines that the token is associated with the affiliated FI. If the ATM circuit 502 determines that the token is associated with an account held at the FI, the ATM circuit 502 is further configured to validate the token, as described further below. Further, if the token is transmitted with a cryptogram (e.g., an encrypted authentication code), the ATM circuit 502 is configured to validate the cryptogram. Once the token and/or the cryptogram is validated by the ATM circuit 204, the customer is then able to complete one or more ATM transactions at the ATM 102 (e.g., a cash withdrawal, an account balance check). If, on the other hand, the ATM circuit 502 determines that the token is associated with an unaffiliated FI, the ATM circuit 502 is configured to process the payment transaction request by transmitting the token (and the cryptogram, if included) to the card network computing system 110, as discussed above (e.g., with reference to FIGS. 2-4).

Furthermore, as discussed above, in certain arrangements the mobile wallet on the mobile device 104 is provided by a third party wallet provider. Accordingly, in such arrangements, when an ATM transaction has occurred using a financial account associated with the affiliated FI, the ATM circuit 502 is configured to notify the third party wallet provider and/or any associated payment networks. For example, the ATM circuit 502 may transmit, through a secure communication channel via the network 108, a notification to the third party wallet provider indicating that an ATM transaction has taken place using the account via the third party wallet provider's mobile wallet.

In the system 500, the ATM 102 also includes a token/encryption key database 524. The token/encryption key database 524 is a storage medium retrievably storing token information and encryption key information. The token/encryption key database 524 may include non-transient data storage mediums (e.g., local disc or flash-based hard drives, local network servers, and the like) or remote data storage facilities (e.g., cloud servers). In some embodiments, the token/encryption key database 524 includes a token vault storing the association between a given token for a customer and the customer's account held at the FI. Accordingly, to validate a token determined to be associated with the affiliated FI, the ATM circuit 502 uses the token vault in the token/encryption key database 524 to identify the PAN for the payment token's associated customer account. In other embodiments, tokens are generated by using an encryption algorithm (e.g., by using an encryption algorithm to generate a hash of the PAN for a customer account). In such embodiments, the token/encryption key database 524 stores an algorithm that can decrypt the token. The ATM circuit 502 accordingly uses the decryption algorithm stored in the token/encryption key database 524 to decrypt the token and thereby retrieve the PAN for the token.

In various embodiments, the token/encryption key database 524 further stores encryption keys such that the ATM circuit 502 is able to decrypt cryptograms transmitted with payment tokens. In some arrangements, the token/encryption key database 524 stores a master encryption key. The ATM circuit 502 uses the master encryption key to decrypt cryptograms transmitted with tokens associated with the affiliated FI, for example, revealing an authentication code associated with the mobile device 104 and/or an authorized user of a subject account. Further, in some arrangements, the token/encryption key database 524 retrievably stores authentication codes such that the ATM circuit 502 is able to determine whether a decrypted authentication code from the cryptogram matches a stored authentication code.

As shown in FIG. 5, the FI computing system 106 includes an FI network interface circuit 218, a data exchange circuit 216, and an FI customer database 214, each of which is configured similarly to the FI network interface circuit 218, the data exchange circuit 216, and the FI customer database 214 shown in FIG. 2. However, in the system 500, the FI computing system 106 also includes an enterprise key management circuit 526. The enterprise key management circuit 526 is configured to manage access to token and encryption information in the system 500. In particular, the enterprise key management circuit 526 is configured to manage the information stored in the token/encryption key database 524 of the ATM 102. In various arrangements, the enterprise key management circuit 526 is configured to provision to the token/encryption key database 524 the information necessary for the ATM circuit 502 to decrypt tokens associated with the affiliated FI. In one example, the enterprise key management circuit 526 provisions a token vault to the token/encryption key database 524, or the enterprise key management circuit 526. In another example, the enterprise key management circuit 526 provisions a decryption algorithm for decrypting and retrieving the PAN from the token. The enterprise key management circuit 526 is further configured to update the token information retrievably stored in the token/encryption key database 524 as necessary. For example, if the payment token that is provisioned to the mobile wallet circuit 208 on the mobile device 104 is periodically changed, the enterprise key management circuit 526 is configured to update the token/encryption key database 524 to replace the old token with the new token when the token is changed. Additionally, in various arrangements, the enterprise key management circuit 526 is configured to provision the information necessary for the ATM circuit 502 to decrypt cryptograms that are transmitted to the ATM 102 along with tokens associated with the affiliated FI. For example, in some arrangements, the enterprise key management circuit 526 transmits the master encryption key to the ATM 102 such that the ATM circuit 502 can decrypt cryptograms using the master encryption key.

However, as will be understood, in certain embodiments the functions of the enterprise key management circuit 526 may be performed by a computing system other than the FI computing system 106 or may be split between computing systems. In one example, the enterprise key management circuit 526 is instead included in the card network computing system 110. In another example, the card network computing system 110 and the FI computing system 106 alternatively each include an enterprise key management circuit 526, with the enterprise key management circuit 526 included in the card network computing system 110 managing access to token information (e.g., a token vault) and the enterprise key management circuit 526 included in the FI computing system 106 managing access to cryptogram information (e.g., a master encryption key). In a third example, the enterprise key management circuit 526 is included in a third party computing system separate from the FI computing system 106 and the card network computing system 110, with the third party computing system having access to both the FI computing system 106 and the card network computing system 110 via the network 108 (e.g., such that the third party computing system can access a token vault managed by the card network computing system 110 and encryption information managed by the FI computing system 106).

Figure 6:
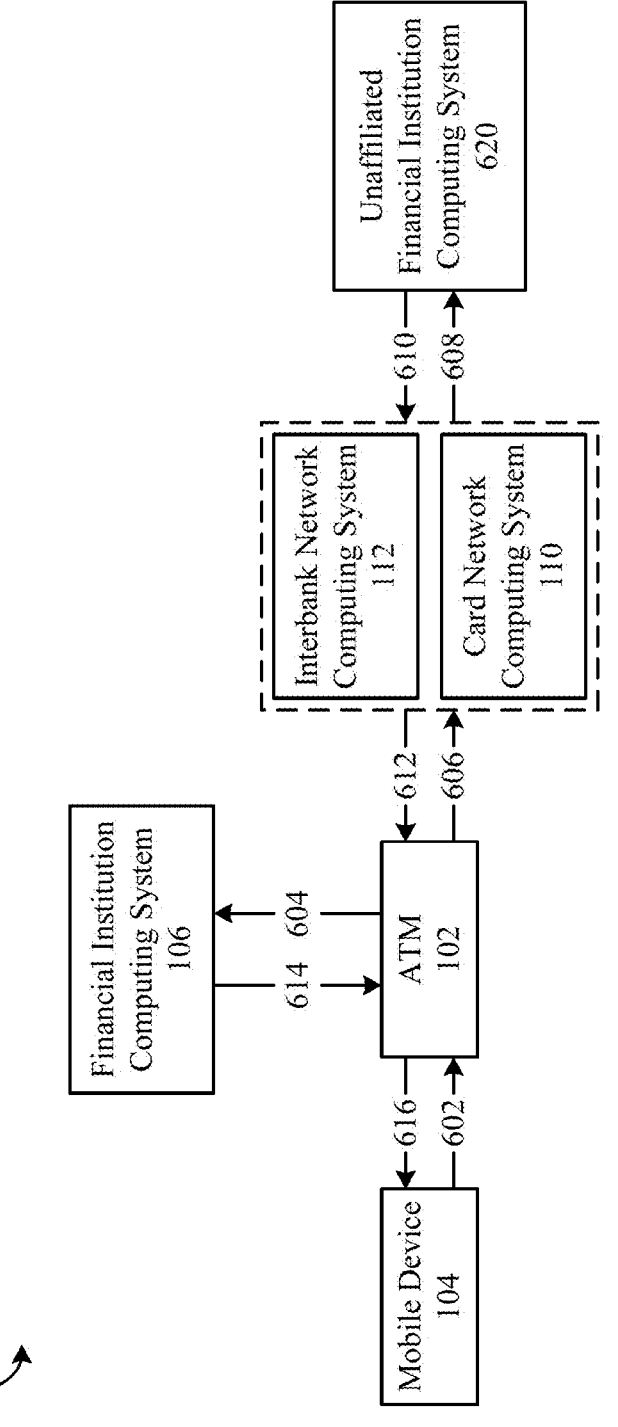
FIG. 6 is a flowchart of a second mobile wallet transaction process, according to an example embodiment.

FIG. 6 illustrates a process 600 that may be implemented by the system of FIGS. 1 and 5. By way of example, FIG. 6 shows a mobile wallet transaction. When a user wishes to transact with the ATM 102, for example, the user may access the mobile wallet circuit 208 by entering a PIN or other login credentials and then selecting a "transact" or similar button via the customer I/O 210. At step 602, the mobile device 104 transmits a payment token and a cryptogram to the ATM 102. For example, the customer I/O 210 may include an NFC device that the mobile wallet circuit 208 uses to establish an NFC session with a corresponding NFC device included in the ATM I/O 204 of the ATM 102. The mobile wallet circuit 208 then transmits the token and, if included, the cryptogram via the NFC session. Alternatively, in other arrangements, the mobile device 104 transmits the payment token and cryptogram via the customer I/O 210 using a QR code, NFC, wireless, Bluetooth, low energy Bluetooth, RFID, hypersonic, Wi-Fi, cellular 3G, 4G, GSM, LiFi, or other method. In some arrangements, at step 616, the ATM 102 provides the mobile device 104 with a confirmation that the payment token was successfully received.

Additionally, in certain arrangements, the mobile wallet circuit 208 is configured to gather and transmit customer authentication information to the ATM 102 at 602. For example, the mobile wallet circuit 208 displays a screen via a display of the mobile device 104 prompting the customer to enter in a PIN. The mobile wallet circuit 208 then transmits the PIN to the ATM 102 (e.g., with the payment token, in response to a confirmation from the ATM 102 indicating that the payment token was successfully received). Alternatively, the ATM 102 requests that the customer provide the customer authentication information via the ATM I/O 204 (e.g., via buttons provided on the ATM 102, via a touchscreen of the ATM 102).

In FIG. 600, the ATM 102 is affiliated with the same FI as the FI computing system 106 (e.g., the "affiliated FI"). Accordingly, upon receiving the token and cryptogram, the ATM 102 determines whether the token is associated with an account held at the affiliated FI. If the ATM 102 determines that the token is associated with the affiliated FI, at step 604, the ATM 102 decrypts and validates the cryptogram (e.g., via a master decryption key), if any, and detokenizes the payment token to identify the customer account. The ATM 102 then communicates with the FI computing system 106 (e.g., via the data exchange circuit 216 of the FI computing system 106) to process the customer's ATM transaction request, and the FI computing system 106 processes the ATM transaction request, for example, as described above with reference to FIG. 4. In some arrangements, the ATM 102 verifies with the FI computing system 106 that received customer authentication information (e.g., a PIN) matches authentication information stored for the customer at the FI computing system 106 (e.g., stored by the FI customer database 214). If there is a match, the ATM 102 then transmits the customer's ATM transaction request (e.g., a balance inquiry, a withdrawal) to the FI computing system 106 along with the an ATM ID. The FI computing system 106 identifies the ATM 102 using the ATM ID. The FI computing system 106 then authorizes one or more transactions in the ATM transaction request and submits a corresponding response to the ATM 102 at 614.

Conversely, if the ATM 102 determines that the token is not associated with the affiliated FI, at step 606, the ATM 102 transmits the ATM transaction request to the card network computing system 110. The card network computing system 110 decrypts and validates the cryptogram (e.g., via a master decryption key), if any, and detokenizes the payment token. The card network computing system 110 may then forward the resulting PAN and the ATM transaction request to the interbank network computing system 112 to identify the FI associated with the token, which in the example of FIG. 6 is the FI associated with the unaffiliated FI computing system 620 (e.g., which is configured similarly to the FI computing system 106 but associated with a different FI).

At 608, the card network computing system 110 or the interbank network computing system 112 transmits the PAN and the ATM transaction request to the unaffiliated FI computing system 620. The unaffiliated FI computing system 620 authenticates the PAN (e.g., verifying that the account is still active, has available funds, is not frozen). In some arrangements, the unaffiliated FI computing system 620 then authorizes one or more transactions in the ATM transaction request (e.g., a balance inquiry, a withdrawal) and submits a corresponding response back upstream to the ATM 102 (e.g., at 610 and 612).

Upon receiving a response from the FI computing system 106 or the unaffiliated FI computing system 620, the ATM 102 provides the user with an appropriate output. For example, the response may prompt one or more logics associated with a cash dispenser of the ATM I/O 204 to collect a requested sum of cash for withdrawal. The ATM I/O 204 may then make the requested sum of cash available to the user (e.g., opening a dispenser door or drawer). In some embodiments, the output may further include a receipt provided by the ATM 102. The ATM 102 may, for example, send the receipt or a confirmation of the ATM transaction to the mobile device 104 electronically at 616 (e.g., via NFC, via the network 108) or physically print the receipt via the ATM I/O 204.

Additionally, in certain arrangements, during or after the ATM transaction, the ATM 102 transmits a notification of the transaction to one or more separate computing systems. For example, the ATM 102 transmits a notification that the transaction has occurred to a third party wallet provider associated with the mobile wallet circuit 208 or transmits a notification that the transaction has occurred to a payment network associated with the account used in the ATM transaction (e.g., the card network computing system 110 associated with the account).

Figure 8:
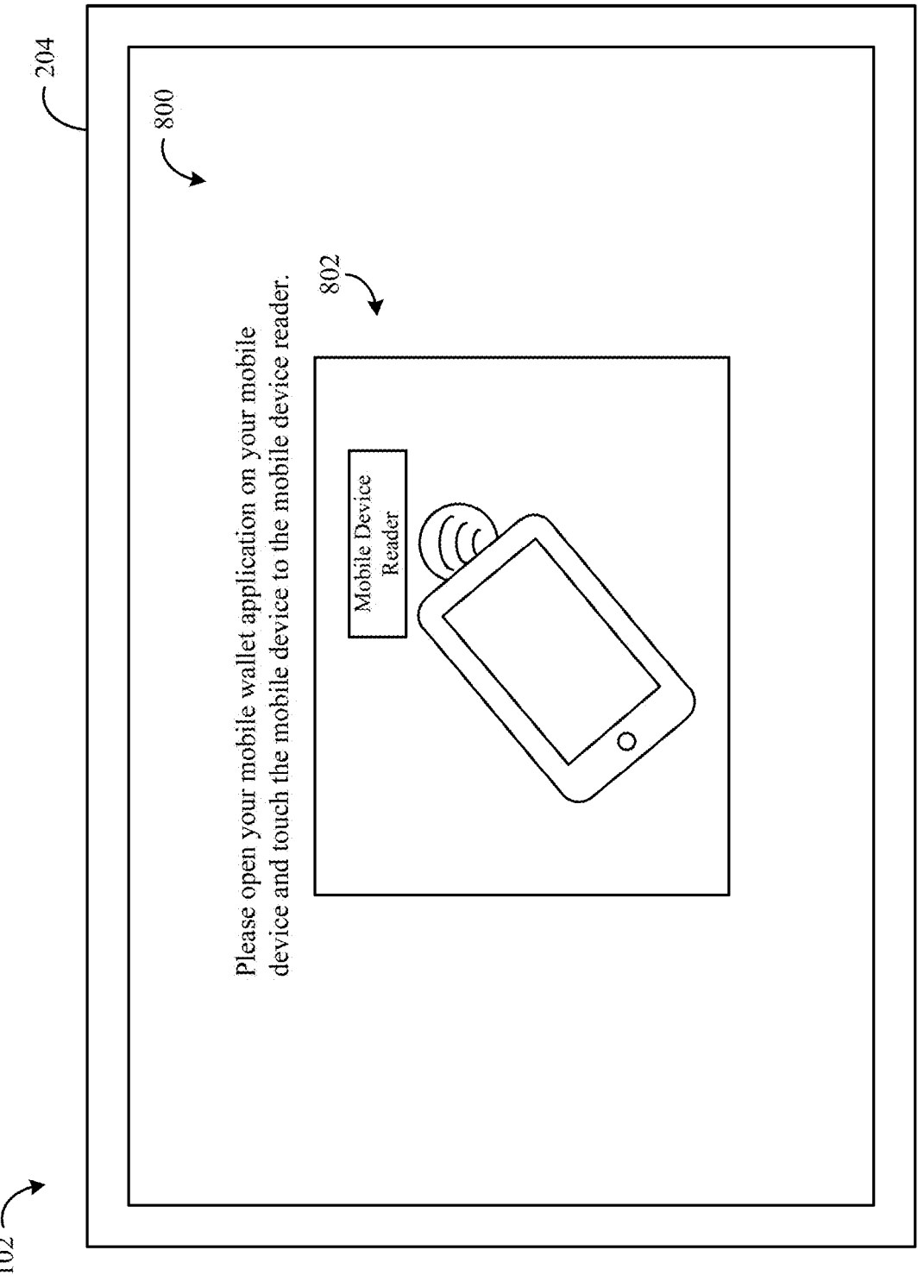
FIG. 8 is a graphical user interface shown, by an automated teller machine display, to a customer as part of a mobile wallet transaction process.
Figure 9:
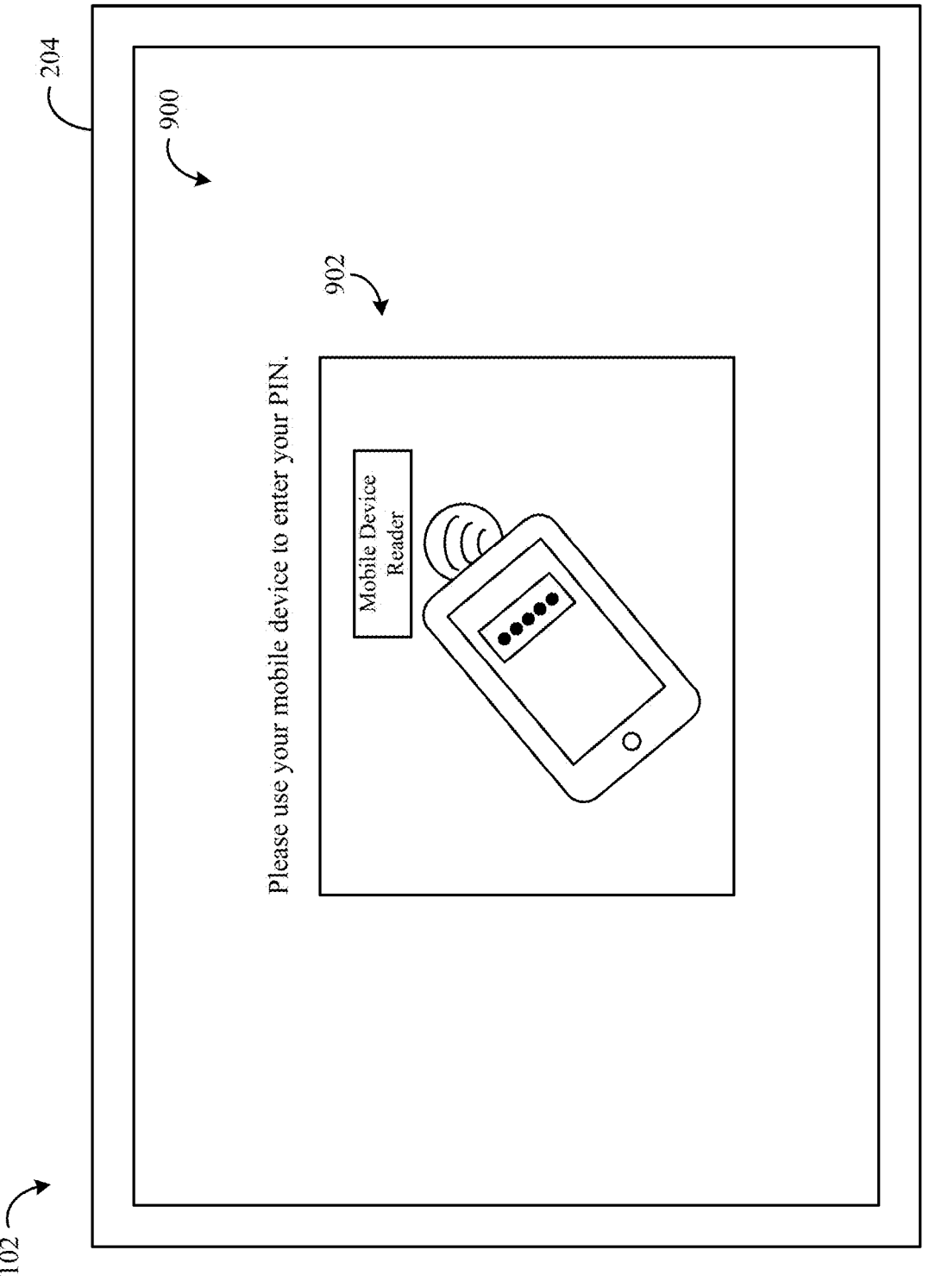
FIG. 9 is a graphical user interface shown, by an automated teller machine display, to a customer as part of a mobile wallet transaction process.
Figure 10:
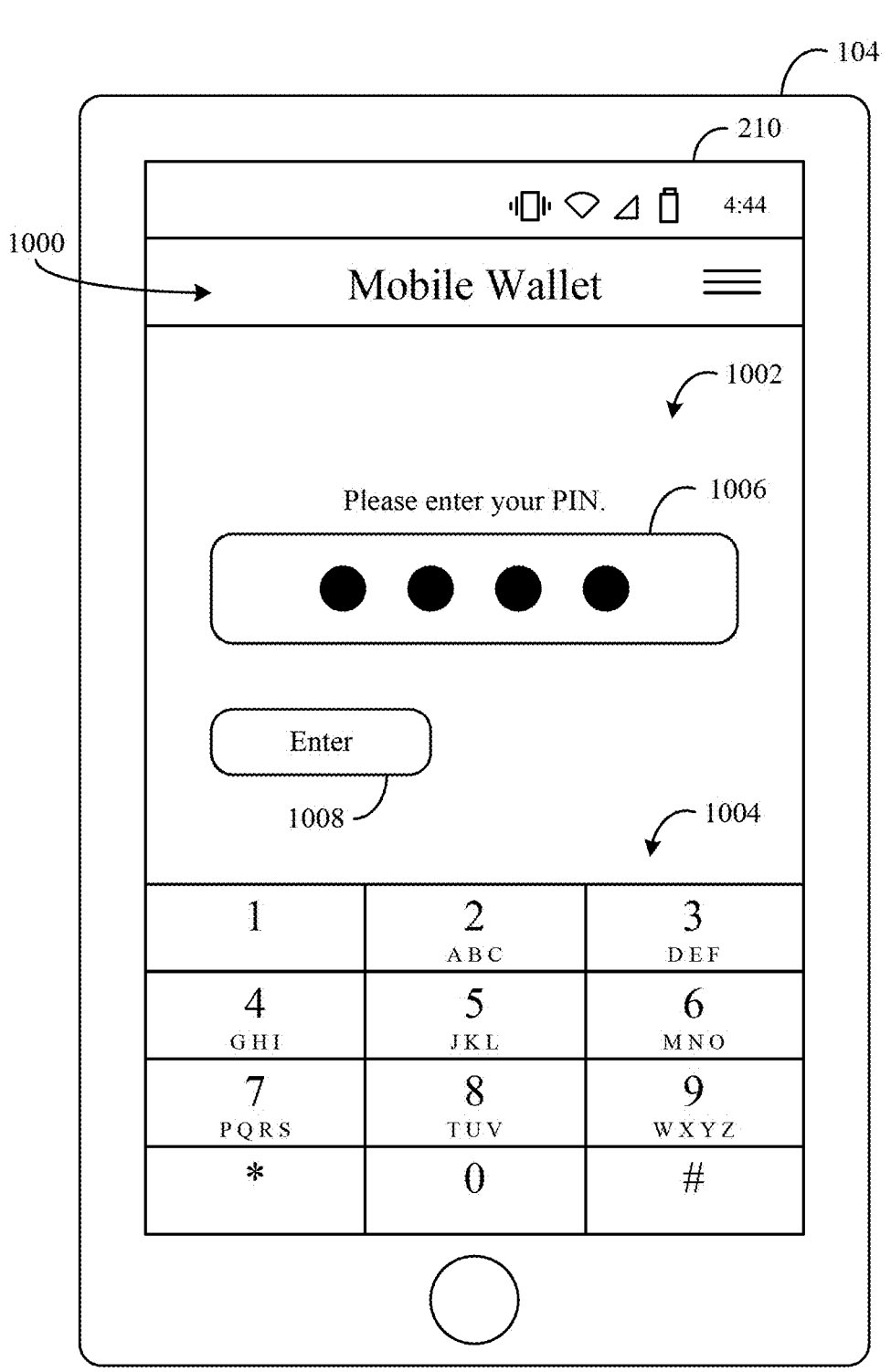
FIG. 10 is a graphical user interface shown, by a mobile device display, to a customer as part of a mobile wallet transaction process.

Referring now to FIGS. 7-9 and 11, graphical user interfaces displayed on the ATM 102 are illustrated, according to example embodiments. Similarly, FIG. 10 depicts a graphical user interface displayed on the mobile device 104, according to an example embodiment. More specifically, FIGS. 7-9 and 11 depict example screenshots shown on a display included in the ATM I/O 204 and FIG. 10 depicts an example screenshot shown on a display included in the customer I/O 210 that are observed by a customer during a process of using a token to carry out an ATM transaction.

Figure 7:
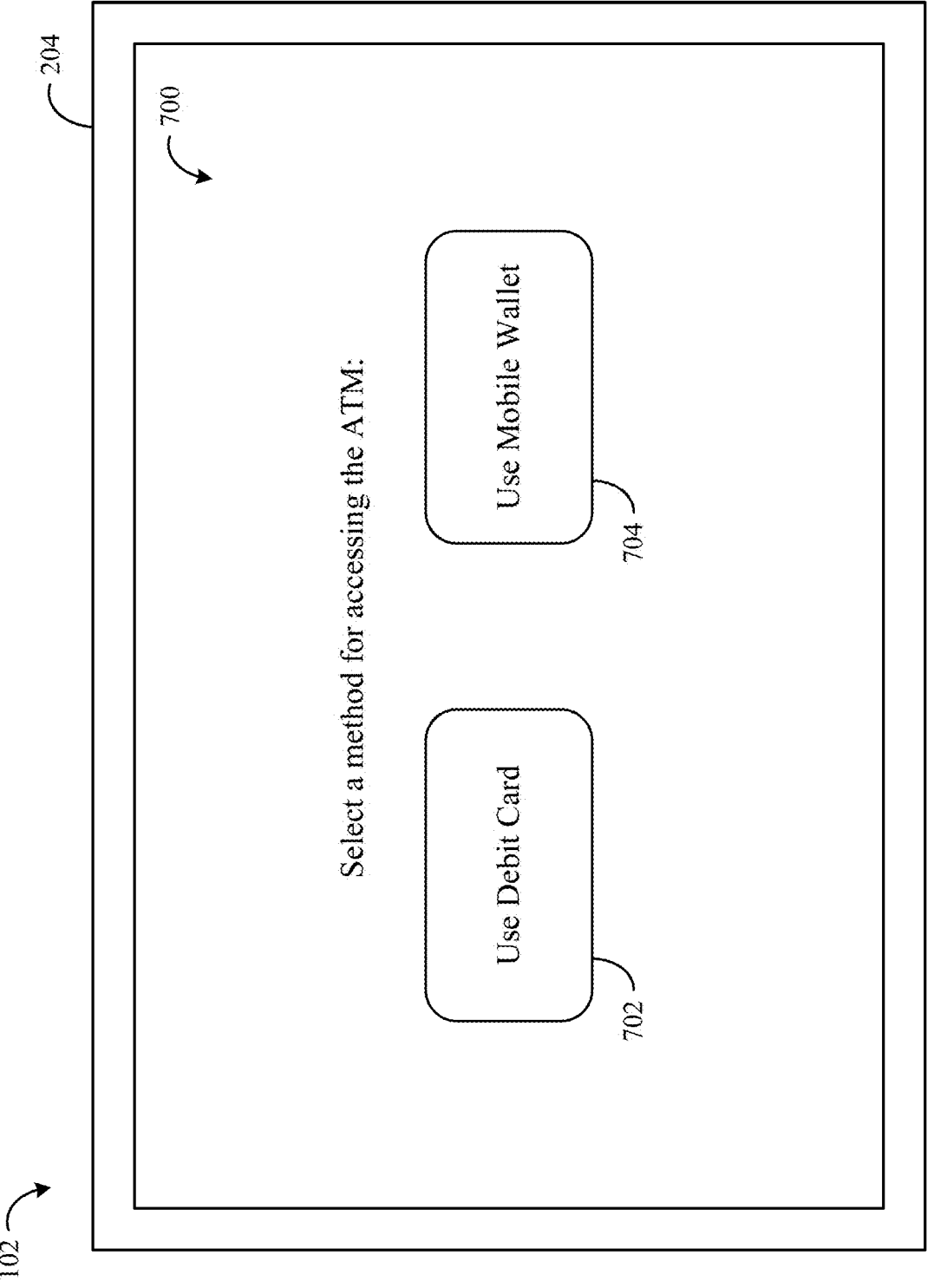
FIG. 7 is a graphical user interface shown, by an automated teller machine display, to a customer as part of a mobile wallet transaction process.

To begin with, FIG. 7 shows a start-up screen 700 of the ATM 102 that the customer observes, for example, upon approaching the ATM 102. As shown, the start-up screen 700 includes two buttons: a first button 702 that the customer can press to indicate that the customer will access the ATM 102 using the customer's debit card and a second button 704 that the customer can press to indicate that the customer will access the ATM 102 using the customer's mobile wallet.

If the customer presses the mobile wallet button 702, the customer is shown a screen 800, illustrated in FIG. 8, including instructions for accessing the ATM 102 using the customer's mobile wallet. For example, as shown, the instructions screen 800 includes instructions telling the customer to open the mobile wallet application on the customer's mobile device 104 and touch the mobile device 104 to a mobile device reader (e.g., having an NFC chip or an RFID reader) included as part of the ATM I/O 204. The instructions screen 800 also includes a diagram 802 depicting a mobile device being brought into contact with the mobile device reader.

In various arrangements, once the customer touches the mobile device 104 to the mobile device reader of the ATM 102, the customer is prompted to enter customer authentication information (e.g., a PIN) associated with the account from which the customer wishes to make the ATM transaction. In some embodiments, the ATM 102 requests that the customer enter the customer authentication information via the ATM I/O 204 (e.g., through button provided on the ATM 102, through a touchscreen of the ATM 102). In other embodiments, the customer enters the customer authentication information through the mobile device 104. Accordingly, the customer may be shown a screen 900 on the ATM display instructing the customer to enter the customer's PIN on the mobile device 104, as shown in FIG. 9. The instructions screen 900 may include instructions telling the customer to use the mobile device to enter the PIN along with a diagram 902 depicting the PIN being entered via the mobile device 104. Accordingly, FIG. 10 depicts an example screenshot of a mobile wallet 1000, as shown on a display (e.g., a touchscreen of the mobile device 104) included in the customer I/O 210 of the mobile device 104. As shown, the mobile device 104 displays a screen 1002 instructing the customer to enter the customer's PIN. The PIN screen 1002 includes a keypad 1004 whereby the customer can enter the PIN and a section 1006 showing the number of digits the customer has so far entered using the keypad 1004. The PIN screen 1006 also includes a button 1008 that the customer can press to enter the PIN once the customer is finished inputting the PIN, in response to which the mobile device 104 transmits the PIN to the ATM 102.

Figure 11:
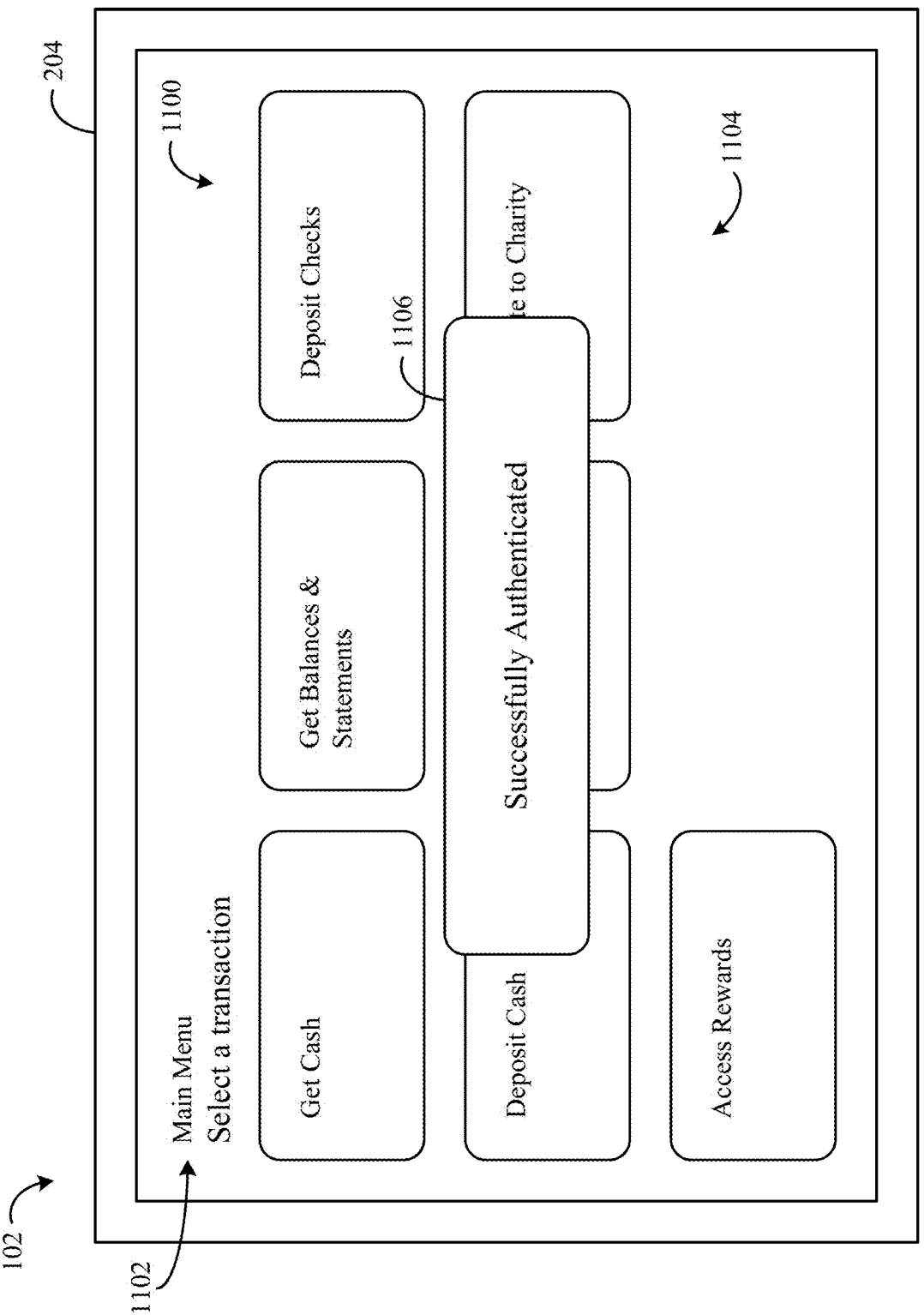
FIG. 11 is a graphical user interface shown, by an automated teller machine display, to a customer as part of a mobile wallet transaction process.

Once the ATM 102 receives the token, cryptogram, and customer authentication information, the ATM 102 either authenticates the cryptogram and detokenizes the token to identify the customer account or transmits the token and cryptogram to the card network computing system 110 and/or the interbank network computing system 112 for authentication and detokenization, as described above with reference to FIG. 5. Additionally, in various arrangements, the ATM 102 also verifies that the customer authentication information received from the customer matches authentication information stored for the customer with the FI computing system 106, or transmits the customer authentication information to an unaffiliated FI computing system (e.g., the computing system 620 shown in FIG. 6) for verification. Assuming, for example, that the PIN entered by the customer matches a PIN stored for the customer, the ATM 102 then communicates with the FI computing system 106 affiliated with the ATM 102 or the unaffiliated FI computing system such that the customer is able to complete the desired one or more ATM transactions. As such, in some arrangements, the ATM 102 displays a screen 1100 to the customer with a main menu 1102 for conducting ATM transactions, as shown in FIG. 11. The main menu 1102 includes a number of buttons 1104 that the customer can press to carry out the desired one or more ATM transactions. The main menu screen 1100 also briefly displays a notification 1106 (e.g., overlapping window) confirming that the customer was successfully authenticated such that the customer knows that the customer is able to carry out the desired one or more ATM transactions. Conversely, in other arrangements, the confirmation notification 1106 may be displayed differently, such as on the display of the mobile device 104.

However, those of skill in the art will appreciate that FIGS. 7-11 are meant to be illustrative rather than limiting. For example, the screens 700, 800, 900, and 1100 shown on the ATM 102 and the screen 1000 shown on the mobile device 104 are merely example screens. In other embodiments, the process of performing ATM transactions using a mobile wallet proceeds differently and/or different screens are shown to the customer. For example, in other embodiments, the customer may select the ATM transactions to be performed using the mobile device 104, enter the PIN using the ATM 102, and so on.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An automated teller machine (ATM), the ATM comprising:

a network interface circuit enabling the ATM to exchange information over a network;

an input/output device configured to exchange data with a mobile wallet circuit on a device associated with a user; and a processing circuit communicably engaged to the network interface circuit and the input/output device and comprising a processor and a memory, the memory structured to store instructions that are executable by the processor and cause the processing circuit to:

receive, by the input/output device, a token and a cryptogram from the mobile wallet circuit as part of a first transaction request, the token being assigned to the mobile wallet circuit based on the device being registered with a financial institution (FI) associated with the user, the token having a permission that limits the token to transactions performed using the device associated with the user, the cryptogram containing an authentication code associated with the user and being encrypted via a unique key provisioned and assigned to the device associated with the user;

generate a second transaction request including the received token and the cryptogram, the second transaction request simulating a point-of-sale transaction and being for a zero or negligible monetary value;

transmit the second transaction request to a card network computing system;

receive, by the network interface circuit, a response to the second transaction request from the card network computing system, wherein the response indicates a validity of the first transaction request based on the card network computing system confirming that the cryptogram was created with the unique key provisioned and assigned to the device by utilizing a token provisioning circuit to decrypt and unpack the cryptogram using a master encryption key that is cryptographically related to the unique key provisioned and assigned to the device to reveal the authentication code and confirming that the authentication code of the cryptogram matches an authentication code stored by the FI associated with the user;

determine whether the token is associated with an FI associated with the ATM;

transmit, in response to the card network computing system determining that the first transaction request is valid and the determination by the ATM that the token is not associated with the FI, the token to a third party computing system such that the ATM is enabled to conduct the first transaction request without detokenizing the token;

receive an indication that the token has been validated by the third party computing system, the token being validated by the third party computing system based on the first transaction request being received from the mobile wallet circuit and the permission of the token; and complete, based on the token being validated by the third party computing system, the first transaction request by dispensing cash to the user via a cash dispenser.

2. The ATM of claim 1, wherein the third party computing system is the card network computing system.

3. The ATM of claim 2, wherein the token is transmitted to the card network computing system for detokenization.

4. The ATM of claim 1, wherein the input/output device includes a near-field communication (NFC) device, and wherein the instructions further cause the processing circuit to:

establish, by the NFC device, an NFC session with the device; and receive the token from the mobile wallet circuit via the NFC session.

5. The ATM of claim 1, wherein the instructions cause the processing circuit to receive, by the input/output device, user authentication information.

6. The ATM of claim 1, wherein the instructions cause the processing circuit to receive, by the network interface circuit, a determination of whether an account associated with a user has sufficient funds for an ATM transaction and an authorization to dispense cash to the user.

7. The ATM of claim 1, wherein the instructions cause the processing circuit to store a plurality of tokens in a token database, each of the plurality of tokens associated with a user account held at the FI.

8. A method of completing transactions at an automated teller machine (ATM), the method comprising:

receiving, by an input/output device of the ATM, a token and a cryptogram from a mobile wallet circuit on a device associated with a user as part of a first transaction request, the token being assigned to the mobile wallet circuit based on the device being registered with a financial institution (FI) associated with the user, the token having a permission that limits the token to transactions performed using the device associated with the user, the cryptogram containing an authentication code associated with the user and being encrypted via a unique key provisioned and assigned to the device associated with the user;

generating, by a processing circuit of the ATM, a second transaction request including the received token and the cryptogram, the second transaction request simulating a point-of-sale transaction and being for a zero or negligible monetary value;

transmitting, by the processing circuit, the second transaction request to a card network computing system;

receiving, by a network interface circuit of the ATM, a response to the second transaction request from the card network computing system, wherein the response indicates a validity of the first transaction request based on the card network computing system confirming that the cryptogram was created with the unique key provisioned and assigned to the device by utilizing a token provisioning circuit to decrypt and unpack the cryptogram using a master encryption key that is cryptographically related to the unique key provisioned and assigned to the device to reveal the authentication code and confirming that the authentication code of the cryptogram matches an authentication code stored by the FI associated with the user;

determining, by the processing circuit, whether the token is associated with an FI associated with the ATM;

transmitting, by the processing circuit in response to the card network computing system determining that the first transaction request is valid and the determination by the ATM that the token is not associated with the FI, the token to a third party computing system such that the ATM is enabled to conduct the first transaction request without detokenizing the token;

receiving, by the processing circuit, an indication that the token has been validated by the third party computing system, the token being validated by the third party computing system based on the first transaction request being received from the mobile wallet circuit and the permission of the token; and completing, by the processing circuit based on the token being validated by the third party computing system, the first transaction request by dispensing cash to the user via a cash dispenser.

9. The method of claim 8, wherein the third party computing system is the card network computing system.

10. The method of claim 9, wherein the token is transmitted to the card network computing system for detokenization.

11. The method of claim 8, wherein the input/output device includes a near-field communication (NFC) device, wherein the method further comprises establishing, by the NFC device, an NFC session with the device, and wherein receiving the token comprises receiving, by the NFC device, the token from the mobile wallet circuit via the NFC session.

12. The method of claim 8, further comprising receiving, by the input/output device, user authentication information, the user authentication information including at least one of a personal identification number (PIN) or a biometric of a user.

13. The method of claim 8, further comprising receiving, by the network interface circuit, a determination of whether an account associated with a user has sufficient funds for an ATM transaction and an authorization to dispense cash to the user.

14. The method of claim 8, further comprising storing, by the processing circuit, a plurality of tokens in a token database, each of the plurality of tokens associated with a user account held at the FI.

15. An automated teller machine (ATM), the ATM comprising:

a network interface circuit enabling the ATM to exchange information over a network;

an input/output device configured to exchange data with a mobile wallet circuit on a device associated with a user; and a processing circuit communicably engaged to the network interface circuit and the input/output device and comprising a processor and a memory, the memory structured to store instructions that are executable by the processor and cause the processing circuit to:

receive, by the input/output device, a token and a cryptogram from the mobile wallet circuit as part of a first transaction request, the token being assigned to the mobile wallet circuit based on the device being registered with a financial institution (FI) associated with the user, the token having a permission that limits the token to transactions performed using the device associated with the user, the cryptogram containing an authentication code associated with the user and being encrypted via a unique key provisioned and assigned to the device associated with the user;

generate a second transaction request including the received token and the cryptogram, the second transaction request simulating a point-of-sale transaction and being for a zero monetary value;

transmit the second transaction request to a card network computing system;

receive a response to the second transaction request from the card network computing system, wherein the response indicates a validity of the first transaction request based on the card network computing system confirming that the cryptogram was created with the unique key provisioned and assigned to the device by utilizing a token provisioning circuit to decrypt and unpack the cryptogram using a master encryption key that is cryptographically related to the unique key provisioned and assigned to the device to reveal the authentication code and confirming that the authentication code of the cryptogram matches an authentication code stored by the FI associated with the user;

determine whether the token is associated with an FI associated with the ATM; and subsequent to the card network computing system determining that the first transaction request is valid, perform one of:

in response to determining that the token is associated with the FI:

process an ATM transaction request using an account associated with the user, the account identified by detokenizing the token, wherein processing the ATM transaction request includes dispensing cash to the user via a cash dispenser; or in response to determining that the token is not associated with the FI:

transmit the token to a third party computing system such that the ATM is enabled to conduct the first transaction request without detokenizing the token;

receive an indication that the token has been validated by the third party computing system, the token being validated by the third party computing system based on the first transaction request being received from the mobile wallet circuit and the permission of the token; and complete, based on the token being validated by the third party computing system, the first transaction request by dispensing cash to the user via a cash dispenser.

16. The ATM of claim 15, wherein the third party computing system is the card network computing system or an interbank network computing system.

* * * * *